US009665194B2

(12) United States Patent
Ito et al.

(10) Patent No.: US 9,665,194 B2
(45) Date of Patent: May 30, 2017

(54) DISPLAY DEVICE AND METHOD FOR MANUFACTURING THE SAME

(71) Applicant: Japan Display Inc., Tokyo (JP)

(72) Inventors: Ryoichi Ito, Tokyo (JP); Toshihiro Sato, Tokyo (JP)

(73) Assignee: Japan Display Inc., Tokyo (JP)

( * ) Notice: Subject to any disclaimer, the term of this patent is extended or adjusted under 35 U.S.C. 154(b) by 140 days.

(21) Appl. No.: 14/490,714

(22) Filed: Sep. 19, 2014

(65) Prior Publication Data

US 2015/0077656 A1 Mar. 19, 2015

(30) Foreign Application Priority Data

Sep. 19, 2013 (JP) ................. 2013-194004

(51) Int. Cl.
*G06F 3/044* (2006.01)
*G06F 1/16* (2006.01)
*G06F 3/047* (2006.01)
*G06F 3/041* (2006.01)
*G02F 1/1333* (2006.01)

(52) U.S. Cl.
CPC ............ *G06F 3/0412* (2013.01); *G06F 3/044* (2013.01); *G06F 3/0416* (2013.01); *G02F 1/13338* (2013.01); *G06F 1/1643* (2013.01); *G06F 3/047* (2013.01); *G06F 2203/04103* (2013.01)

(58) Field of Classification Search
CPC ........ G06F 3/044; G06F 1/1643; G06F 3/047; G06F 3/0412
See application file for complete search history.

(56) References Cited

U.S. PATENT DOCUMENTS

| 2011/0279410 | A1* | 11/2011 | Han | G06F 3/044 345/174 |
| 2012/0098787 | A1* | 4/2012 | Kim | G06F 3/044 345/174 |
| 2013/0314625 | A1* | 11/2013 | Tsai | G06F 3/044 349/12 |
| 2014/0014960 | A1* | 1/2014 | Yamazaki | G06F 3/0412 257/59 |

FOREIGN PATENT DOCUMENTS

| JP | 2010-140369 A | 6/2010 |
| JP | 2011-53620 A | 3/2011 |

* cited by examiner

*Primary Examiner* — Nathanael R Briggs
*Assistant Examiner* — Alexander Gross
(74) *Attorney, Agent, or Firm* — Typha IP LLC

(57) ABSTRACT

In a seal part where a translucent opposite substrate and an element substrate are bonded together, a peripheral member is provided in such a manner as to be buried in a sealing member. This prevents the sealing member from breaking, thus making it possible to make the seal part durable to improve the strength of the panel. Further, an output wiring connected to an electrode pattern of a sensing unit can be protected by being covered with a protective insulating layer. The peripheral member and the protective insulating layer can be formed by the same insulating material. This makes it possible to simplify the process to reduce production costs.

12 Claims, 28 Drawing Sheets

DISPLAY DEVICE AND METHOD FOR MANUFACTURING THE SAME

CROSS REFERENCE TO RELATED APPLICATIONS

This application is based upon and claims the benefit of priority from the prior Japanese Patent Application No. 2013-194004, filed on Sep. 19, 2013, the entire contents of which are incorporated herein by reference.

FIELD

An embodiment of the present invention relates to a display device having an input function and, for example, to a structure in which a sensor unit and a display unit are integrated.

BACKGROUND

There is growing popularity of computer devices and portable electronic devices each of which has both a display function and an input function and each of which allows an operation to be performed by operating it in such a manner as to touch a displayed image. Such an electronic device employs a display panel called a touch panel (or a touchscreen). In the mainstream of touch panels are capacitive touch panels, and also in the mainstream is a system in which a change in capacitance of a sensor electrode is detected and this change in capacitance is converted into an input signal.

For example, Japanese Laid-Open Patent Publication No. 2010-140369 discloses a capacitive touch panel including: a transparent substrate; a first electrode pattern formed on one surface of the transparent substrate, the first electrode pattern being formed by a transparent conductive film, the first electrode pattern having a plurality of X electrodes arranged along a row-wise direction and in rows; an intermediate insulating layer formed over the first electrode pattern, and a second electrode pattern formed over the intermediate insulating layer, the second electrode pattern being formed by a transparent conductive film, the second electrode pattern having a plurality of Y electrodes arranged along a column-wise direction and in columns, the second electrode pattern forming a matrix with the first electrode pattern. Putting this touch panel on top of a display panel such as a liquid crystal panel can constitute an external touch panel. However, merely integrating a touch sensor panel with a display panel ends up causing the resulting panel to be thick and heavy.

On the other hand, a touch panel called an internal (in-cell) touch panel is structured such that a touch sensor unit is fabricated into a color filter substrate or an element substrate. For example, Japanese Laid-Open Patent Publication No. 2011-053620 discloses, as an example of a sensor-containing type, a method for manufacturing a substrate for use in a display device with a touch panel, the method including: forming a touch sensor layer on one surface of a substrate; forming a protecting layer that protects the touch sensor layer; and forming a color filter layer over the other surface of the substrate, wherein the color filter layer is formed after the protecting layer is formed.

The touch panel disclosed in Japanese Laid-Open Patent Publication No. 2010-140369 does not have a protective film on an output wiring (metal wiring) connected to an electrode pattern formed by a transparent conductive film, and as such, it is structured such that the output wiring is broken due to a flaw and/or corroded by moisture or the like. Further, since the output wiring made from metal is formed after the electrode pattern formed by the transparent conductive film is formed, processing of the output wiring by dry etching causes the electrode pattern formed by the transparent conductive film to be etched. Further, processing of the output wiring by wet etching raises such a problem that the occurrence of electrolytic corrosion makes it impossible to make contact between the electrode pattern and the output wiring.

The method for manufacturing a substrate for use in a display device with a touch panel as disclosed in Japanese Laid-Open Patent Publication No. 2011-053620 provides a touch sensor unit with a protective film; however, the protective film is merely intended to protect the electrodes and/or wirings of the touch sensor, and is incorporated into the substrate for use in a display device in such a structure as not to be useful at all for the element substrate or the color filter substrate.

However, merely integrating a touch sensor panel with a display panel ends up causing the resulting panel to be thick and heavy. In view of this, there has been proposed a system (in-cell type) in which a touch sensor function is fabricated into one of two substrates constituting a display panel. In such a case, however, flexible printed wirings are attached to both an element substrate and an opposite substrate to which a touch sensor function has been added. This makes it necessary to fix the two substrates while keeping them thin.

SUMMARY

A display device according to an embodiment of the present invention includes: a translucent opposite substrate having a sensing unit provided with a first electrode pattern and a second electrode pattern, the first electrode pattern and the second electrode pattern each provided by a transparent conductive film, the first electrode pattern extending along a first direction, the second electrode pattern extending along a second direction intersecting the first direction; an element substrate provided with a pixel unit in accordance with the sensing unit; a sealing member having a closed-loop pattern surrounding the sensing unit, the sealing member fixing the translucent opposite substrate and the element substrate to each other with the translucent opposite substrate and the element substrate placed opposite each other, and the translucent opposite substrate having an output wiring overlapping a portion of the sealing member, a protective insulating layer provided as burying the output wiring, and a peripheral member provided as overlapping the sealing member. The output wiring, the protective insulating layer and the peripheral member are provided over the same side with the first electrode pattern at the translucent opposite substrate; the protective insulating layer is provided with an opening through which an upper end face of the output wiring is exposed; the first electrode pattern is extended from the sensing unit and electrically connected to the output wiring through the opening of the protective insulating layer, the sealing member being provided in such a manner as to bury the peripheral member.

A display device according to an embodiment of the present invention includes: a translucent opposite substrate having a sensing unit provided with a first electrode pattern and a second electrode pattern, the first electrode pattern and the second electrode pattern each provided by a transparent conductive film, the first electrode pattern extending along a first direction, the second electrode pattern extending along a second direction intersecting the first direction; an element substrate provided with a pixel unit in accordance with the sensing unit; a sealing member having a closed-loop pattern surrounding the sensing unit, the sealing member fixing the translucent opposite substrate and the element substrate to each other with the translucent opposite substrate and the element substrate placed opposite each other, the translucent opposite substrate having an output wiring overlapping a portion of the sealing member, a protective insulating layer provided as burying the output wiring, and a peripheral member provided as overlapping the sealing member. The first electrode pattern and the second electrode pattern are provided with an insulating film sandwiched therebetween and over the same side at the translucent opposite substrate; the protective insulating layer is provided with an opening through which an upper end face of the output wiring is exposed; the first electrode pattern is extended from the sensing unit and electrically connected to the output wiring through the opening of the protective insulating layer, the sealing member being provided in such a manner as to bury the peripheral member.

According to another embodiment, the peripheral member can be substantially a same in height as the protective insulating layer. Further, the peripheral member may be made of a same insulating material as the protective insulating layer.

According to another embodiment, it is preferable that the peripheral member be a laminated structure which is substantially a same as a laminated structure composed of the output wiring, the protective insulating layer burying the output wiring, and the first electrode pattern electrically connected to the output wiring through the opening.

According to another embodiment, the first electrode pattern and the second electrode pattern may have different patterns, and the first electrode pattern may have such a wide-area rectangular pattern as to contain a regular pattern of the second electrode pattern.

A method for manufacturing a display device according to an embodiment of the present invention includes the steps of: forming a sensing unit provided by overlapping a first electrode pattern which extending along a first direction and a second electrode pattern which extending along a second direction intersecting the first direction, and that the first electrode pattern and the second electrode pattern do not make direct contact with each other; placing an element substrate opposite the translucent opposite substrate, the element substrate is provided with a pixel unit corresponding to the sensing unit; forming a sealing member on at least either the translucent opposite substrate or the element substrate so that the seal member has a closed-loop pattern surrounding the sensing unit; and forming an output wiring of the first electrode pattern, a protective insulating layer, and a peripheral member over the surface of the translucent opposite substrate on which the first electrode pattern is provided, so that at least part of the output wiring is in a region overlapping the sealing member, that the protective insulating layer buries the output wiring and is provided with an opening through which an upper end face of the output wiring is exposed, that the peripheral member is provided in such a manner as to overlap the sealing member, that the peripheral member is buried in the sealing member, and the peripheral member is forming so as an embedded in the sealing member.

According to another embodiment, the peripheral member may be formed to be substantially a same in height as the protective insulating layer. Further, the peripheral member may be formed by a same insulating material as the protective insulating layer.

According to another embodiment, the peripheral member may be formed to have a laminated structure which is substantially a same as a laminated structure composed of the output wiring, the protective insulating layer burying the output wiring, and the first electrode pattern electrically connected to the output wiring through the opening.

According to another embodiment, the second electrode pattern may formed in a regular pattern, and the first electrode pattern may be formed in such a wide-area rectangular pattern as to contain the regular pattern of the second electrode pattern.

DESCRIPTION OF EMBODIMENTS

Embodiments of the present invention are described below with reference to the drawings and the like. However, the present invention may be carried out in many different aspects, and should not be narrowly interpreted within the limits of the contents of description of the embodiments exemplified below.

It should be noted that in terms of content of the invention described below, different drawings share the same reference signs to refer to the same components or components having similar functions, in which case repetitive description is omitted unless the circumstances are exceptional. In the present specification, in the case where certain components or areas are present "over" or "under" and "above" or "below" other components or areas, as long as there are no particular limitations, this includes not only the case where components or areas are directly above or directly below other components or areas but also the case where components or areas are above or below other components or areas with other structural components provided in between.

Embodiment 1

Figure 1:
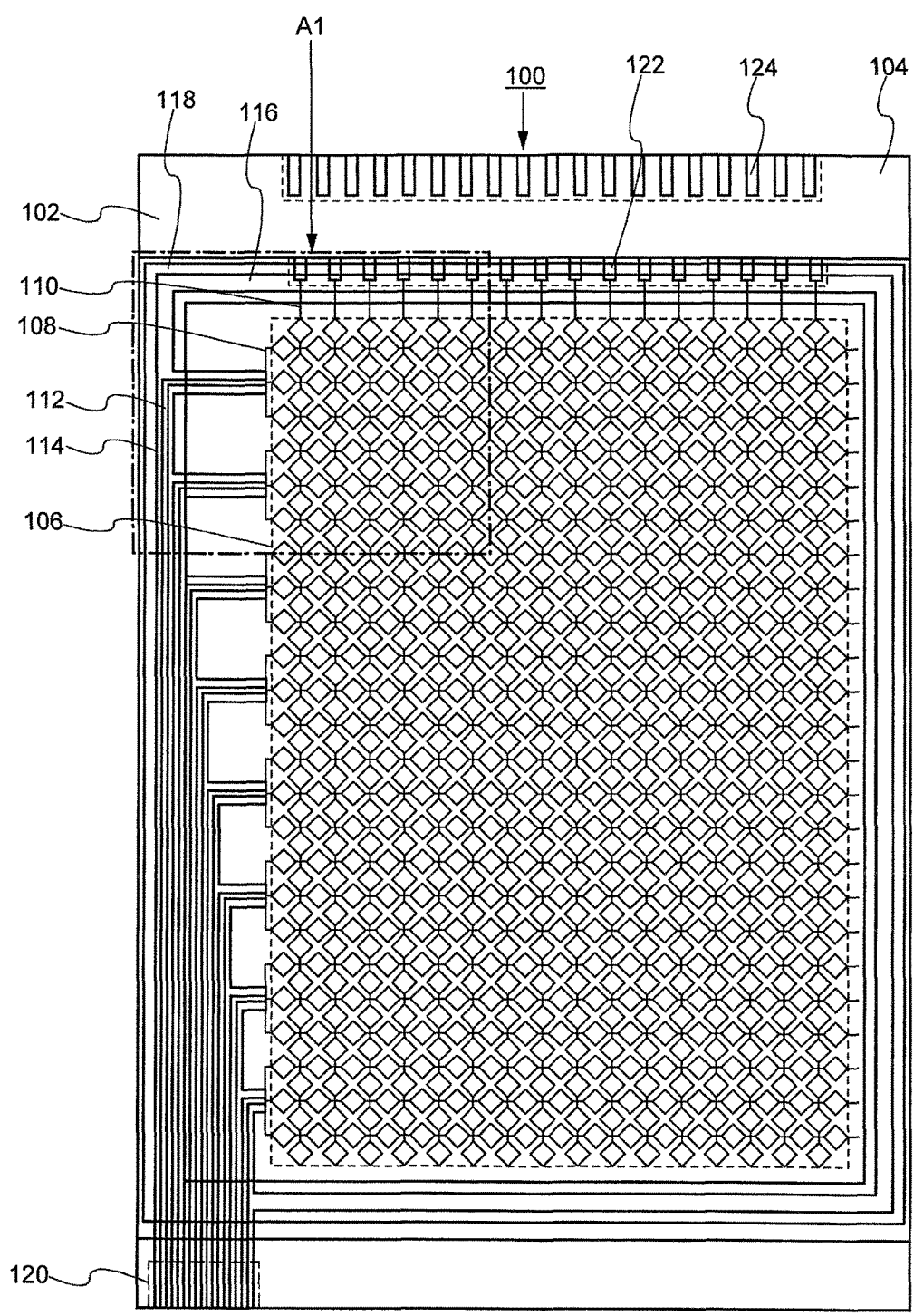
FIG. 1 is a diagram showing a configuration of a display device according to an embodiment of the present invention.

The present embodiment exemplifies a configuration of a display device 100 having an input function. FIG. 1 shows an overview of the display device 100 according to the present embodiment. The display device 100 includes a translucent opposite substrate 102 and an element substrate 104. The translucent opposite substrate 102 and the element substrate 104 is fixed by a seal member 118. The translucent opposite substrate 102 is provided with a first electrode pattern 108 extending along a first direction (e.g., an X direction) and a second electrode pattern 110 extending along a second direction (e.g., a Y direction) intersecting the first direction. By preparing a plurality of these first electrode patterns 108 and a plurality of these second electrode patterns 110 and arranging them to form a matrix, a sensing unit 106 is formed. In the following description, the element substrate comprises a substrate provided with the devices such as a transistor and the light emitting device, and the translucent opposite substrate includes a sensing unit, output wiring, protective member and peripheral member.

The element substrate 104 is provided with a pixel unit formed by display elements. In the element substrate 104, the display elements form the pixel unit by being arranged in a region overlapping the sensing unit 106 of the translucent opposite substrate 102. Further, the element substrate 104 may be provided with a circuit configured to control the display elements.

Since the sensing unit 106 of the translucent opposite substrate 102 is provided in a region overlapping a display screen of the display device 100, the first electrode patterns 108 and the second electrode patterns 110 are made of a transparent conductive material. For example, the first electrode patterns 108 and the second electrode patterns 110 are formed by transparent conductive films such as those made of indium tin oxide (ITO), a composite material of indium tin oxide and zinc oxide (IZO), or the like.

The sensing unit 106 formed by the first electrode patterns 108 and the second electrode patterns 110 detects a position of contact by changes in capacitance. That is, by detecting a change in capacitance of a first electrode pattern 108 for the X direction and detecting a change in capacitance of a second electrode pattern 110 for the Y direction, the sensing unit 106 can specify which position in a plane of the sensing unit 106 has been touched. It should be noted that in the display device 100 exemplified by the present embodiment, the first electrode patterns 108 are provided over the surface of the translucent opposite substrate 102 that faces toward the element substrate 104 and the second electrode patterns 110 are provided over the surface of the translucent opposite substrate 102 that faces away from the element substrate 104.

Each of the first electrode patterns 108 is electrically connected to a first output wiring 112 so that an electric potential with a change in capacitance is taken out as a detection signal to an external circuit. The first output wiring 112 is made of a low-resistance metal material so that a faint signal by a change in capacitance is taken out without being attenuated. A plurality of these first output wirings 112 are needed, and since integrating them into a bundle forms a nontransparent region, they are formed by metal thin wirings extending along an edge of the translucent opposite substrate 102 so as not to overlap the pixel unit of the element substrate 104. By thus providing output wirings extending along a long side of the translucent opposite substrate 102, the attenuation of detection signals from the first electrode patterns 108 arranged along the long side can be reduced.

A protective insulating layer 114 is provided along the first output wirings 112. The protective insulating layer 114 is provided in such a manner as to bury the first output wirings 112. It is preferable that the protective insulating layer 114 be formed so thick that the first output wirings 112 are buried in the protective insulating layer 114, and it is preferable that the protective insulating layer 114 have a cross-sectional shape having tapered side edge faces to make bumps formed by the first output wirings 112 gentler.

The sealing member 118 is formed in a closed-loop pattern surrounding the sensing unit 106. For this reason, in a region where a first output wiring 112 is routed, the sealing member 118 is provided in such a manner as to overlap the first output wiring 112 and the protective insulating layer 114. Therefore, if no measures are taken, the surface where the sealing member 118 makes contact with the translucent opposite substrate 102 is not uniform, with the result that the contact surface varies in material and height with location.

However, in the present embodiment, a peripheral member 116 is provided in such a manner as to overlap the sealing member 118. The peripheral member 116 is provided in a region where at least the first output wirings 112 are not formed. Alternatively, the peripheral member 116 may be provided in such a manner as to continuously extend from a region where the first output wirings 112 and the protective insulating layer 114 are formed to another region so that the peripheral member 116 overlaps the sealing member 118.

By thus providing the peripheral member 116, the surface where the sealing member 118 makes contact can be made uniform. Further, by causing the height of the peripheral member 116 to be substantially equal to the thickness of the protective insulating layer 114, the height of a region where the sealing member 118 makes contact with the translucent opposite substrate 102 can be made uniform.

That is, by causing the height of the peripheral member 116 to be substantially equal to the height of the protective insulating layer 114, the height of the seal member 118 over the whole outside edge can be made uniform. Further, by forming the peripheral member 116 and the protective insulating layer 114 from the same material, a seal part can be made uniform in material.

The translucent opposite substrate 102 is provided with a first terminal area 120 and a second terminal area 122. The first terminal area 120 includes output terminals of the first output wirings 112, and the second terminal area 122 includes output terminals of the second electrode patterns 110. The element substrate 104 is provided with a third terminal area 124.

Figure 2A:
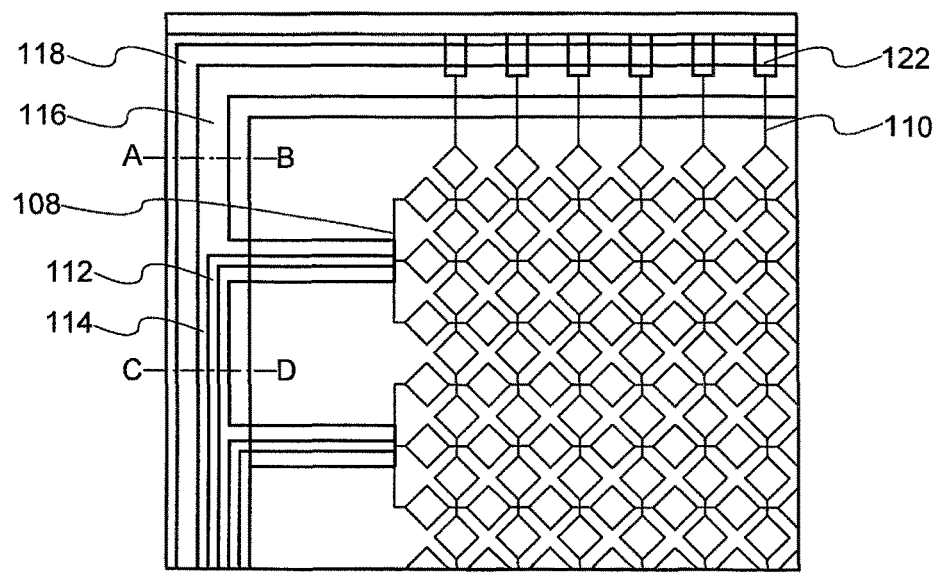
FIG. 2A is a plan view showing a configuration of a particular part of the display device shown in FIG. 1.
Figure 2B:
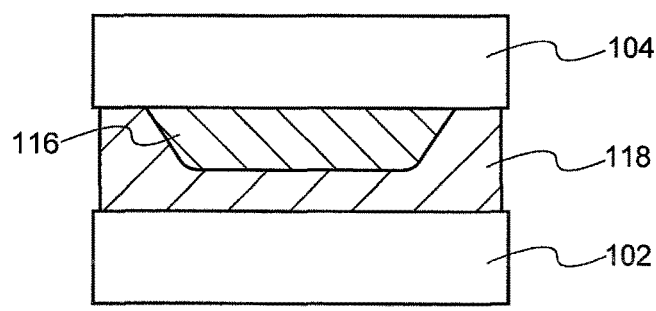
FIG. 2B is a cross-sectional view of a part corresponding to a line A-B shown in FIG. 2A.
Figure 2C:
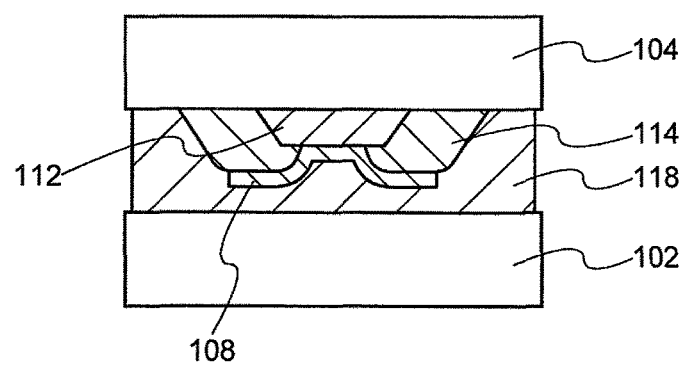
FIG. 2C is a cross-sectional view of a part corresponding to a line C-D shown in FIG. 2A.

Next, the first output wirings 112, the protective insulating layer 114, the peripheral member 116, and the sealing member 118 are described in detail below with reference to FIGS. 2A, 2B, and 2C. FIG. 2A shows an enlarged view of a region A1 surrounded by an alternate long and short dash line in FIG. 1. Further, cross-sectional structures corresponding to a line A-B and a line C-D indicated by alternate long and short dash lines in FIG. 2A are shown in FIG. 2B and FIG. 2C, respectively.

As shown in FIG. 2A, the seal member 118 is provided along a peripheral part of a region where the element substrate 104 and the translucent opposite substrate 102 overlap. The peripheral member 116 is provided in such a manner as to overlap the sealing member 118. The width of the peripheral member 116 is narrower than the width of a seal pattern formed by the sealing member 118. Further, the peripheral member 116 is thinner than the thickness of the sealing member 118. That is, as shown in FIG. 2B, the peripheral member 116 is buried in the sealing member 118. The sealing member 118, sandwiched between the translucent opposite substrate 102 and the element substrate 104, fixes the two substrates, and also so contains the pixel unit placed in a region inside of the closed-loop pattern formed by the sealing member 118 that the pixel unit is protected from direct contact with the atmosphere. For this reason, the seal part can be regarded as being constituted by the peripheral member 116 and the sealing member 118.

It is preferable here that the peripheral member 116 and the sealing member 118 each be made of an organic resin material. In this case, since the peripheral member 116 is formed over the translucent opposite substrate 102, there is a degree of freedom of selection of the organic resin material of which the peripheral member 116 is made. On the other hand, since the sealing member 118 serves to cause the element substrate 104 and the translucent opposite substrate 102 to adhere to each other, the process conditions and material for the element substrate 104 are limited to those which do not affect the display elements and the like formed over the element substrate 104.

For example, the peripheral member 116 can be made of a thermosetting organic resin material that is comparatively high in bond strength. On the other hand, it is preferable that the sealing member 118 be made of a thermosetting resin or photo-curable resin that can be processed at comparatively low temperatures. By thus forming the seal part from the members made of different materials, the strength of the seal part can be improved. Further, since the amount of the sealing member 118 that is used can be reduced, the production costs can be reduced.

The first output wirings 112 are provided along an outer edge of the translucent opposite substrate 102, and extend from the outer edge to the first electrode patterns 108, respectively. For lower wiring resistance, it is preferable that each of the first output wirings 112 be made of a metal material such as aluminum. It is preferable that as shown in FIG. 2C, the protective insulting layer 114 be provided in such a manner as to make the bump gentler by covering side surfaces and upper corners of the first output wiring 112. In other words, the first output wiring 112 can be deemed to be buried in the protective insulating layer 114.

The protective insulating layer 114 has an opening through which an upper surface of the first output wiring 112 is exposed. The first electrode pattern 108 is formed along a surface of the protective insulating layer 114, and makes contact with the first output wiring 112 through the opening to form an electrical connection. It is preferable here that the protective insulating layer 114 have a cross-sectional shape having inclined surfaces (tapered shapes), instead of having a cross-sectional shape having a stepped bump.

By interposing the protective insulating layer 114 in connecting the first electrode pattern 108 to the first output wiring 112, the electrical connection can be ensured. If there is no protective insulating layer 114, an attempt to form contact by forming a first output wiring 112 and then forming a first electrode pattern 108 on exactly the same plane may end up with breaking of the first electrode pattern 108 by a bump formed by the first output wiring 112, thus resulting in a faulty electrical connection. Processing an end of a first output wiring 112 into a tapered shape can eliminate a faulty connection at a bump, but forming ends of all wirings into tapered shapes ends up making it difficult to miniaturize (integrate) the wirings. Further, dry etching of the first electrode pattern 108, which is formed by a transparent conductive film, with exposure of a metal pattern forming the first output wiring 112 causes the metal pattern to be etched. Further, an attempt to process the first electrode pattern 108, which is formed by a transparent conductive film by wet etching, causes the first output wiring 112, which is made of a metal material such as aluminum, to be corroded by an electrochemical reaction.

Such problems can be solved by providing a protective insulating layer 114 in such a manner as to cover the side surfaces and upper ends of a first output wiring 112 and bringing a first electrode pattern 108 into contact with the first output wiring 112 through an opening provided over then upper surface of the protective insulating layer 114. Since the protective insulating layer 114 can be provided in such a manner as to bury a plurality of first output wirings 112, the degree of integration of first output wirings 112 does not need to be lowered even if the protective insulating layer 114 has its side edges tapered. Further, since the protective insulating layer 114 serves as a protective film for the first output wirings 112, the first output wirings 112 can be prevented from being broken due to a flow and from being corroded by moisture. Such defects can be overcome even when the first electrode pattern 108 is processed by drying etching or wet etching, as an area of exposure of each of the first output wirings 112 can be minimized.

The peripheral member 116 and the protective insulating layer 114 may be made of the same insulating material. In such a case, the peripheral member 116 and the protective insulating layer 114 may be formed to be continuous. The continuous formation of the peripheral member 116 and the protective insulating layer 114 allows the sealing member 118 to make contact with a surface of the peripheral member 116 and a surface of the protective insulating layer 114 at exactly the same level, thus allowing the sealing member 118 to be uniform in strength. It should be noted that it is preferable to use an organic resin material as the insulating material of which the peripheral member 116 and the protective insulating layer 114 are made, and for example, an acrylic or imide organic resin material can be used.

Figure 3A:
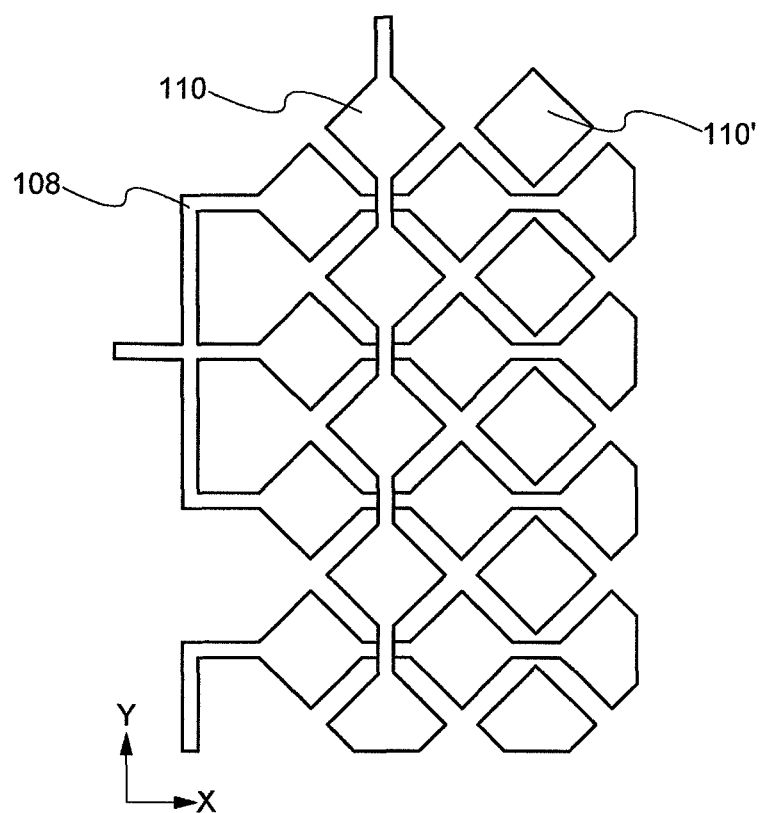
FIG. 3A is a diagram showing an example configuration of electrodes in a sensing unit.
Figure 3B:
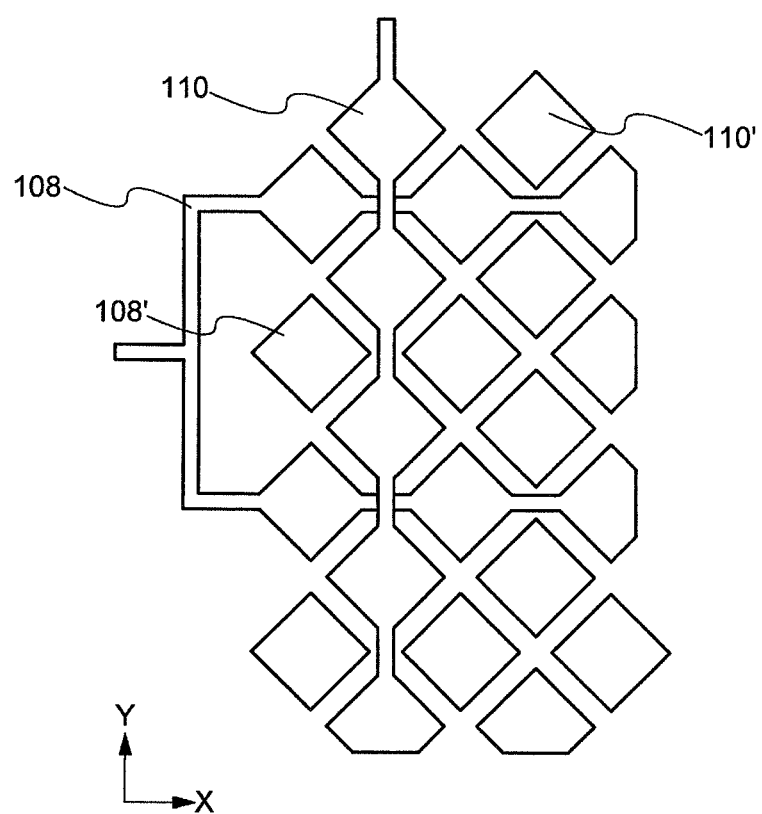
FIG. 3B is a diagram showing an example configuration of electrodes in a sensing unit.

FIGS. 3A and 3B shows the sensing unit 106 in detail. In FIG. 3A, a first electrode pattern 108 extends along the X direction, and a second electrode pattern 110 extends along the Y direction. The first electrode pattern 108 and the second electrode pattern 110 each has rhombic electrodes tightly arranged at regular intervals. The first electrode pattern 108 and the second electrode pattern 110 are not in direct contact with each other. Moving a finger toward these electrode patterns causes capacitances between a plurality of electrodes to change at the same time, and the position can be specified by detecting this change in capacitance. That is, by detecting a change in capacitance from the first electrode pattern 108 for the X direction and detecting a change in capacitance from the second electrode pattern 110 for the Y direction, which position in the plane of the sensing unit 106 has been contacted (touched) by the finger can be detected.

Since the first electrode pattern 108 and the second electrode pattern 110 are formed in a pattern that is far smaller than, for example, a finger of a user, it is not necessary to utilize all of the electrode patterns to detect a touch. For example, as shown in FIG. 3A, a dummy second electrode pattern 110' may be provided which is not connected to an output wiring. Alternatively, as shown in FIG. 3B, a dummy first electrode pattern 108' may be provided which is not connected to an output wiring. An electrode pattern which is not connected to an output wiring makes no contribution in terms of sensing; however, leaving a regular pattern of electrodes contributes to making the electrode patterns invisible in terms of appearance.

Figure 4:
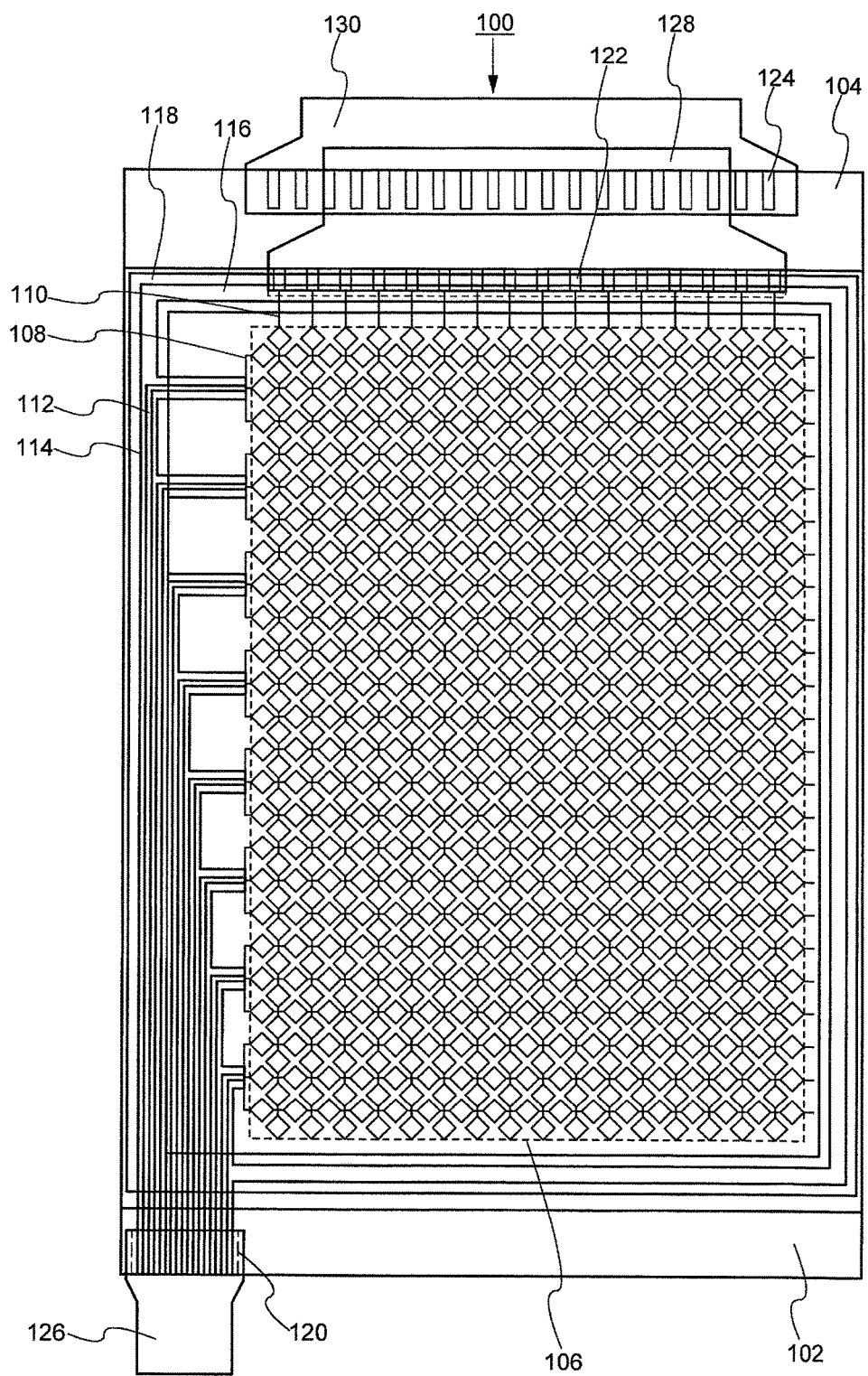
FIG. 4 is a diagram showing a configuration of a display device according to an embodiment of the present invention.

FIG. 4 shows an aspect of a module in which flexible printed circuits (hereinafter referred to also as "FPCs") are attached to the display device 100 shown in FIG. 1. Further, FIG. 5 shows a cross-sectional schematic view of the module shown in FIG. 4.

In FIG. 4, a first FPC substrate 126 that is electrically connected to the first electrode patterns 108 and a second FPC substrate 128 that is electrically connected to the second electrode patterns 110 are attached to the translucent opposite substrate 102. Further, a third FPC substrate 130 is attached to the element substrate 104.

Figure 5:
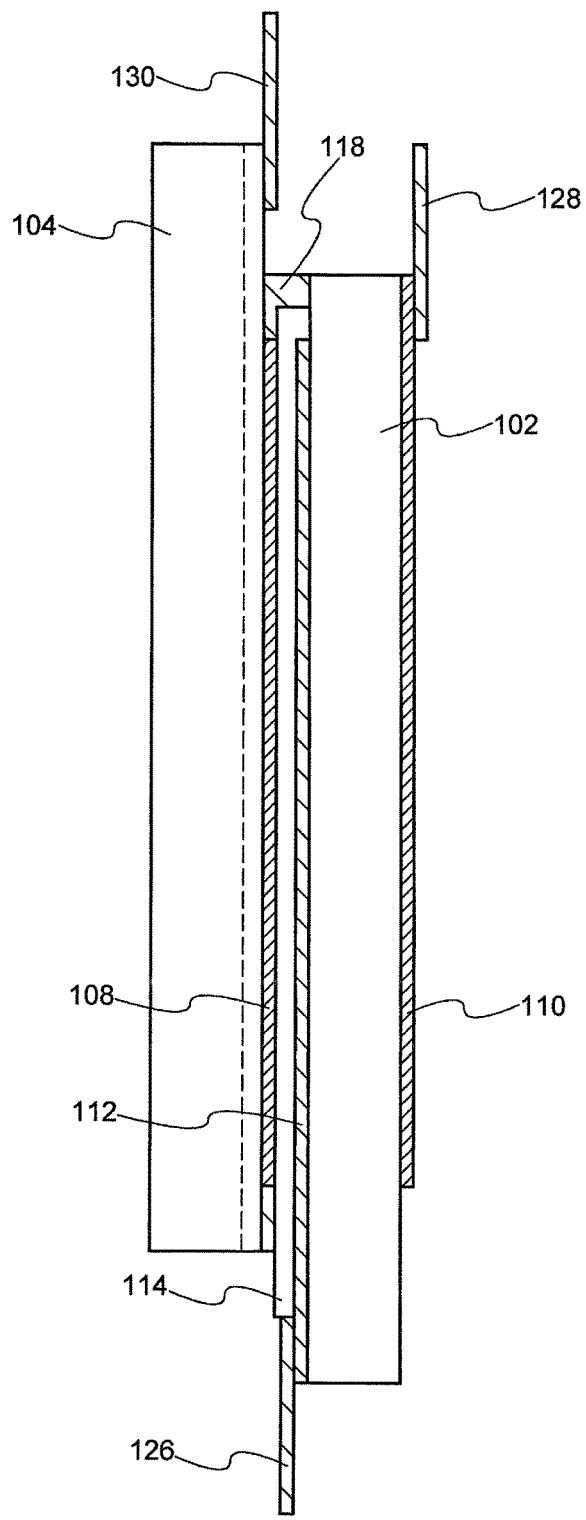
FIG. 5 is a diagram showing a configuration of a display device according to an embodiment of the present invention.

It should be noted that in the display device 100 according to the present embodiment as shown in FIG. 5, the first electrode patterns 108 are provided over the surface of the translucent opposite substrate 102 that faces toward the element substrate 104 and the second electrode patterns 110 are provided over the surface of the translucent opposite substrate 102 that faces away from the element substrate 104. Moreover, the translucent opposite substrate 102 and the element substrate 104 is fixed by the sealing member 118. Since a glass substrate, a plastic substrate, or the like is used as a base material for the translucent opposite substrate 102, the first electrode patterns 108 and the second electrode patterns 110 are electrically isolated by an insulating member made of glass, plastic, or the like sandwiched therebetween. Moreover, the first electrode patterns 108 are routed together with the first output wirings 112 over the protective insulating layer 114 while making contact with the first output wirings 112.

As shown in FIG. 4, it is preferable that a plurality of output wirings 112 be bundled together in a peripheral part of the translucent opposite substrate 102, and that the output wirings 112 have their output ends concentrated at one edge of the translucent opposite substrate 102. By thus integrating the output wirings 112, the first FPC substrate 126 can be made smaller in size. Meanwhile, in the present embodiment, the second FPC substrate 128 that is connected to the second electrode patterns 110 is configured to be connected in accordance with the second electrode patterns 110.

Figure 6:
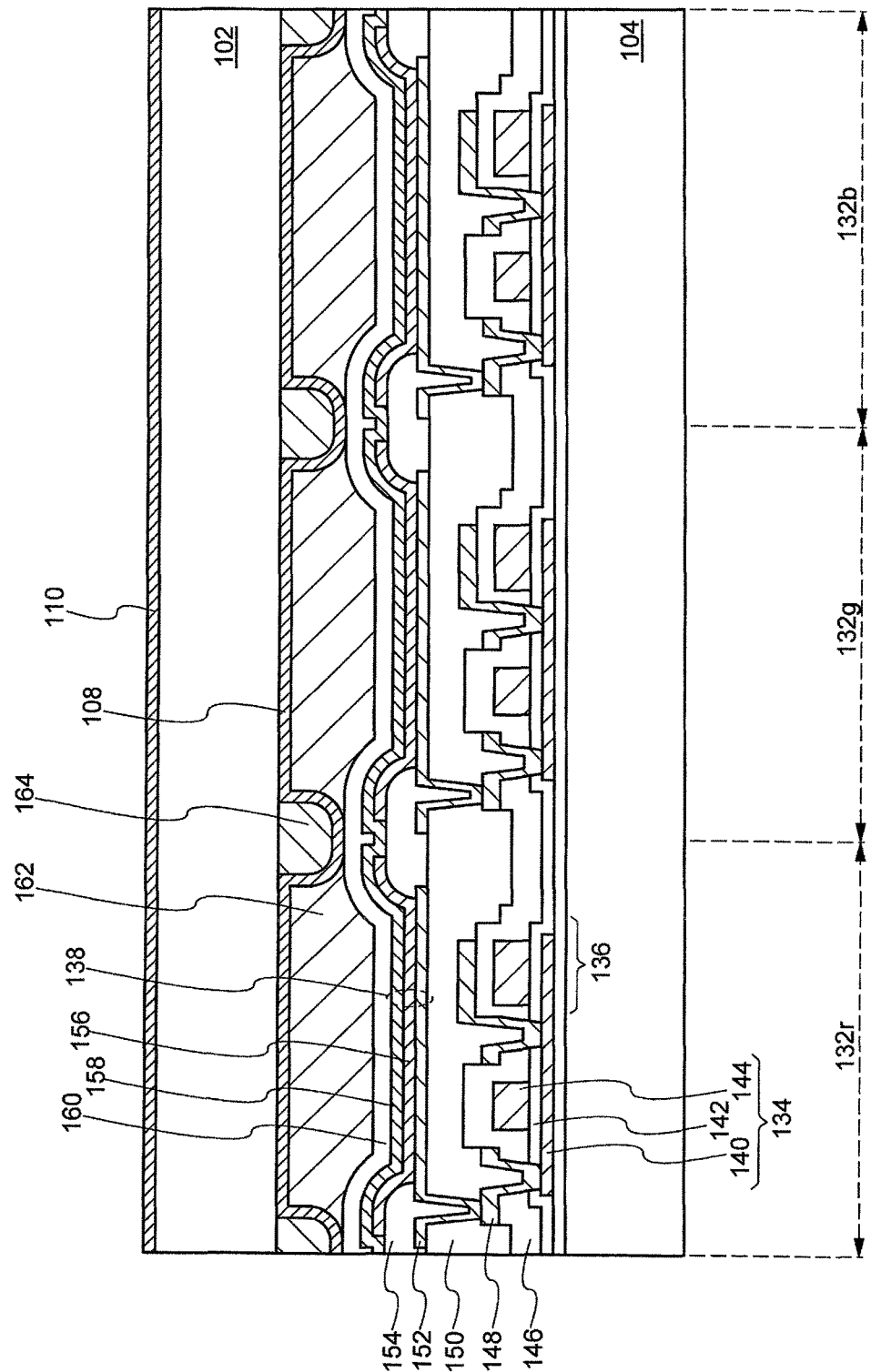
FIG. 6 is a diagram showing an example of a pixel unit in a display device according to an embodiment of the present invention.

FIG. 6 shows details of the pixel unit in the display device of the present embodiment. FIG. 6 shows a cross-sectional structure of a first pixel 132r, a second pixel 132g, and a third pixel 132b. The first pixel 132r, the second pixel 132g, and the third pixel 132b here exemplify a red pixel, a green pixel, and a blue pixel, respectively. These pixels have a configuration basically in common.

Each of the pixels is provided with a transistor 134, a storage capacitor 136, and a light-emitting element 138. The transistor 134 is constituted by a semiconductor layer 140, a gate insulating layer 142, and a gate electrode 144, with a source-drain electrode 148 connected to a pixel electrode 152. A first interlayer insulating layer 146 is provided between the gate electrode 144 and the source-drain electrode 148, and a second interlayer insulating layer 150 is provided between the source-drain electrode 148 and the pixel electrode 152. The light-emitting element 138 is constituted by joining the pixel electrode 152, a light-emitting layer 156, and a counter electrode 158 on top of each other. The light-emitting layer 156 contains an organic electroluminescence material. Moreover, using different luminescent colors of organic electroluminescence material for each separate pixel allows the first pixel 132r, the second pixel 132g, and the third pixel 132b to be a red pixel, a green pixel, and a blue pixel, respectively. This makes it possible to achieve a display device including an input function having a graphical interface that is compatible with a color display.

A partition wall layer 154 is provided between pixel electrodes so as to partition one pixel from another. A passivation layer 160 is provided over the counter electrode 158 so as to protect the light-emitting element 138 from deterioration by moisture or the like. Further, the first electrode patterns 108 are provided over the surface of the translucent opposite substrate 102 that faces toward the element substrate 104, and the second electrode patterns 110 are provided over the surface of the translucent opposite substrate 102 that faces away from the element substrate 104. Furthermore, the element substrate 104 and the translucent opposite substrate 102 are placed opposite each other with a gap therebetween, with a filling material 162 provided in the gap. The filling material 162 may contain a desiccating agent by which deterioration of the light-emitting element 138 can be suppressed. Further, the adhesive strength and mechanical strength of the element substrate 104 and the translucent opposite substrate 102 can be enhanced by providing the filling material 162.

Spacers 164 may be provided between the element substrate 104 and the translucent opposite substrate 102. Even when the filling material 162 is provided between the element substrate 104 and the translucent opposite substrate 102, the spacers 164 can be provided in such a manner as to stand in the filling material 162. The spacers 164 can be formed over the side of the translucent opposite substrate 102. In such a case, the spacers 164 can be made of the same organic resin material as the peripheral member 116. That is, the spacers 164 can be fabricated in the same step as the peripheral member 116.

By being provided in a region overlapping the partition wall layer 154, the spacers 164 can prevent a decrease in aperture ratio of the pixels. Although the spacers 164 can be provided correspondingly for each separate pixel, the spacer 164 may be placed at regular intervals so that each of them is provided for a plurality of pixels.

The spacers 164 have a function of keeping the distance between the element substrate 104 and the translucent opposite substrate 102 constant. Further, it is preferable that the spacers 164 be provided even in a case where no filling material is provided between the element substrate 104 and the translucent opposite substrate 102. In a case where the gap between the element substrate 104 and the translucent opposite substrate 102 is held in a reduced-pressure condition, the presence of the spacers 164 can keep the distance between the two substrates constant even under atmospheric pressure.

Figure 7A:
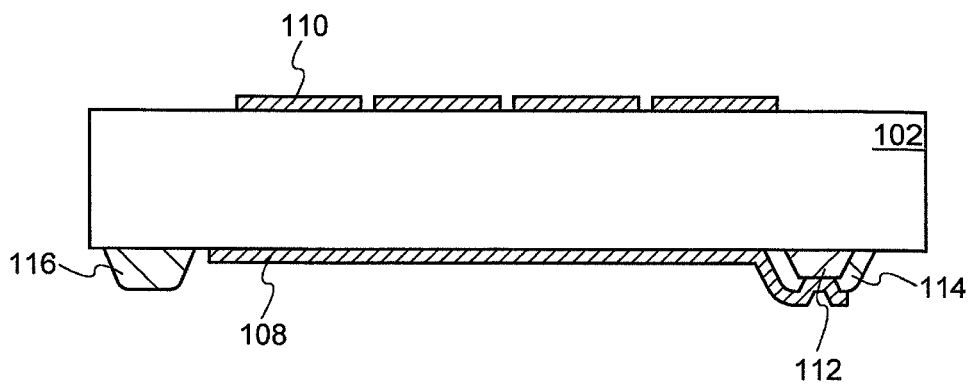
FIG. 7A is a diagram showing a step of fabricating a translucent opposite substrate in a display device according to an embodiment of the present invention.

An overview of a process for manufacturing such a display device is described with reference to FIGS. 7A, 7B and 7C. FIG. 7A shows a step of manufacturing of the translucent opposite substrate 102. A first output wiring 112 is formed over the base material for the translucent opposite substrate 102. The first output wiring 112 is formed by a metal material such as aluminum. The first output wiring 112 is formed in a peripheral part of the translucent opposite substrate 102.

Then, a protective insulating layer 114 is formed to cover the side surfaces and upper ends of the first output wiring 112. It is preferable that the protective insulating layer 114 be formed by an organic material such as acrylic resin. It is preferable that the protective insulating layer 114 be formed so that its side surfaces are inclined surfaces. Further, processing is carried out so that the protective insulating layer 114 is provided with an opening through which part of the first output wiring 112 is exposed.

A peripheral member 116 is formed over the peripheral part of the translucent opposite substrate 102. The peripheral member can be formed by any material, but it is preferable that the peripheral member be formed at the same time as the protective insulating layer 114. The process can be simplified by forming the protective insulating layer 114 and the peripheral member 116 at the same time. In either case, it is preferable that the protective insulating layer 114 and the peripheral member 116 be formed to be substantially the same in thickness (height). Forming them to be uniform in height makes it possible to keep uniform the height of a sealing member 118 that is to be formed in a subsequent step. Even when formed by an organic resin material, the protective insulating layer 114 and the peripheral member 116 are cured at this stage to be fixed to the translucent opposite substrate 102.

A first electrode pattern 108 is formed on one surface of the translucent opposite substrate 102 on which the first output wiring 112 is formed, and a second electrode pattern 110 is formed over the other surface of the translucent opposite substrate 102. The first electrode pattern 108 and the second electrode pattern 110 are each formed by a transparent conductive film. The first electrode pattern 108 is extended to the first output wiring 112, and the extended portion is formed along a surface of the protective insulating layer 114, and is provided to make contact with the first output wiring 112 through the opening.

Figure 7B:
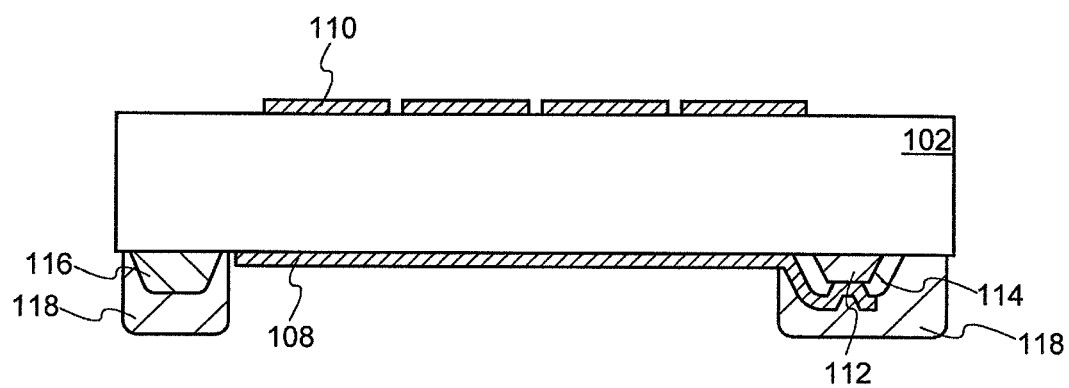
FIG. 7B is a diagram showing a step of forming a sealing member in a display device according to an embodiment of the present invention.

FIG. 7B shows a step of forming of the sealing member 118. The sealing member 118 is formed in accordance with a region where the peripheral member 116 has been formed. It is preferable that the sealing member 118 be formed to be thicker and wider than the peripheral member 116. Further, the sealing member 118 is also formed in a region where the first output wiring 112 is formed. The sealing member 118 is formed in a closed-loop pattern by using a dispenser. It is preferable that the sealing member 118 be formed by a photo-curable and adhesive organic resin composition. Alternatively, the sealing member 118 may be formed by a thermosetting organic resin composition. By providing the peripheral member 116 in advance in a region where the sealing member 118 is to be formed, the amount of the sealing member 118 that is used can be reduced. The sealing member 118 is not completely cured at the stage of having been drawn, and is maintained in an uncured state.

Figure 7C:
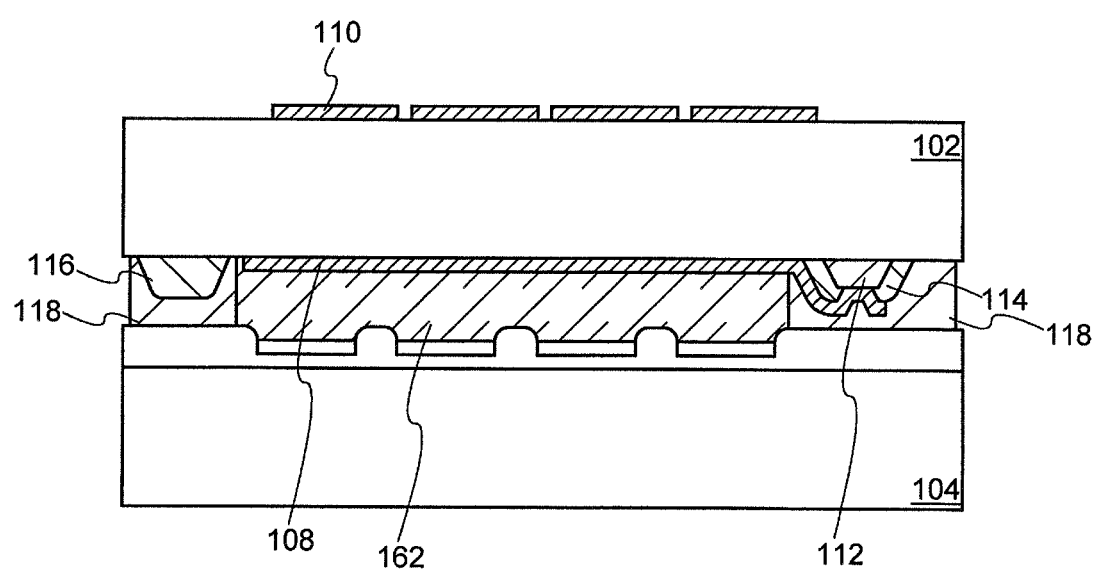
FIG. 7C is a diagram showing a step of bonding together a translucent opposite substrate and an element substrate in a display device according to an embodiment of the present invention.

FIG. 7C shows a step of bonding together the translucent opposite substrate 102 thus fabricated and a element substrate 104. First, a filling material 162 is dropped or applied to a region inside of the sealing member 118 formed in a loop. The filling material 162 is dropped in the required amount so that when the translucent opposite substrate 102 and the element substrate 104 are bonded together with a gap therebetween, the gap is filled without a cavity therein. The filling material 162 may be an organic resin material, e.g. may be a gel-like desiccating agent.

After that, the element substrate 104, provided with a pixel unit, and the translucent opposite substrate 102, on which the filling material 162 has been piled up, are placed opposite each other and bonded together. The translucent opposite substrate 102 and the element substrate 104 is bonded together under reduced pressure. When brought back to atmospheric pressure from reduced pressure while being bonded together, the translucent opposite substrate 102 and the element substrate 104 are pressed by atmospheric pressure. When the width of the gap is narrowed by the application of atmospheric pressure to the translucent opposite substrate 102 and the element substrate 104, the filling material 162 is compressed, so that a pressure force of the filling material 162 acts on the sealing member 118. Even in such a case, the outside member 116, provided in such a manner as to be buried in the sealing member 118, can prevent the filling material 162 from leaking out, without the sealing member 118 breaking. Then, in this state, the sealing member 118 is cured, and the translucent opposite substrate 102 and the element substrate 104 is fixed. This is how a display device can be fabricated.

Thus, according to the present embodiment, covering the output wiring with the protective insulating layer can prevent the output wiring from being broken due to a flaw and from being corroded by moisture or the like. Also when the first electrode pattern is formed over the output wiring, the presence of the protective insulating layer over the output wiring can prevent the output wiring from being damage by etching. Further, in the seal part, sealing strength can be improved by forming a seal pattern from members made of different materials. This makes it possible to improve the strength of a panel obtained by bonding together the wiring substrate and the element substrate. Moreover, since the amount of the sealing member that is used can be reduced, the production cost can be reduced.

Further, according to the present embodiment, covering the output wiring with the protective insulating layer and causing the output wiring and the first electrode pattern to make contact with each other through the opening provided in the protective insulating layer make it possible to secure the electrical connection between the first electrode pattern and the output wiring while protecting the output wiring. Further, providing the peripheral member so that it is buried in the seal member can make durable the seal part formed by the sealing member.

<Modification 1>

Figure 8:
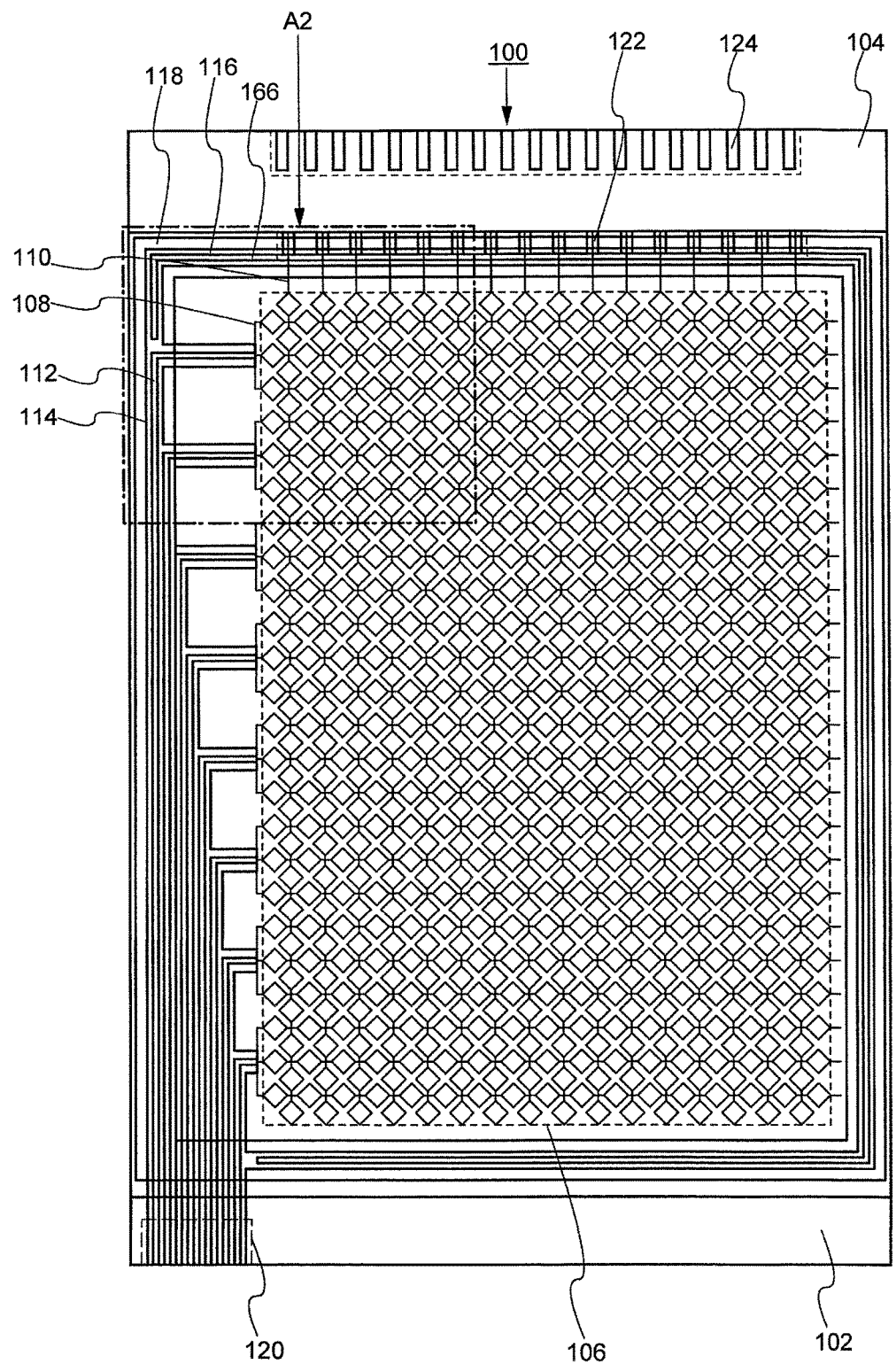
FIG. 8 is a diagram showing a configuration of a display device according to an embodiment of the present invention.

FIG. 8 shows a display device of an aspect whose seal part differs in morphology from that shown in FIG. 1. In the seal part, a dummy wiring pattern 166 having the same structure as a first output wiring 112 is provided in such a manner as to be buried, as well as the peripheral member 116 buried in the sealing member 118. In a region other than a region where the seal pattern formed by the sealing member 118 overlaps the first output wiring 112, the dummy wiring pattern 166 is provided in such a manner as to extend substantially all around the seal pattern. That is, the dummy wiring pattern 166 is provided in such a manner as to overlap the peripheral member 116. For example, the dummy wiring pattern 166 can be formed at the same time as the first output wiring 112. However, the dummy wiring pattern 166 has a cut and is isolated from the first output wiring 112.

Figure 9A:
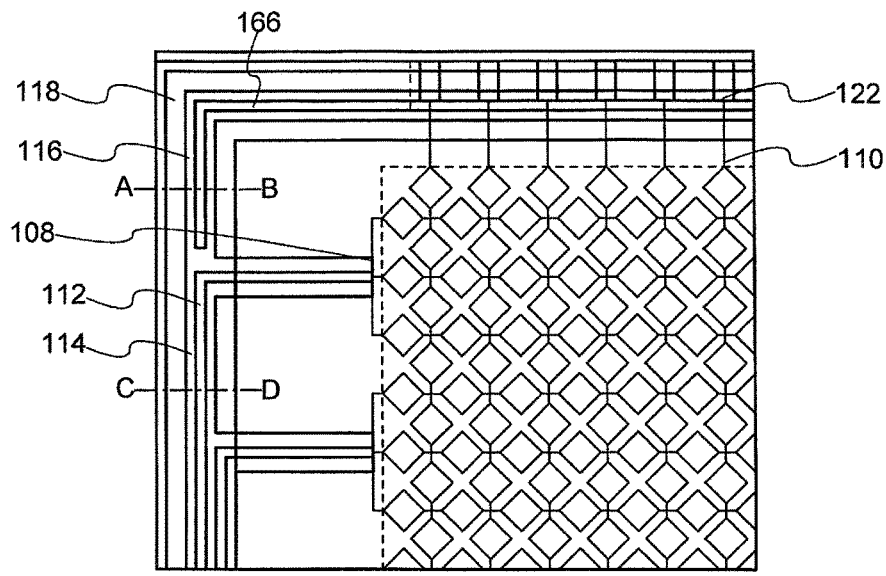
FIG. 9A is a plan view showing a configuration of a particular part of the display device shown in FIG. 8.
Figure 9B:
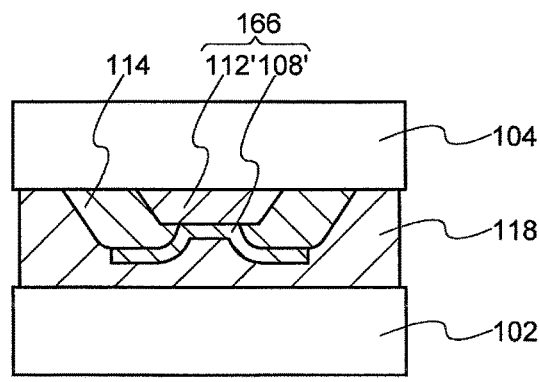
FIG. 9B is a cross-sectional view of a part corresponding to a line A-B shown in FIG. 9A.
Figure 9C:
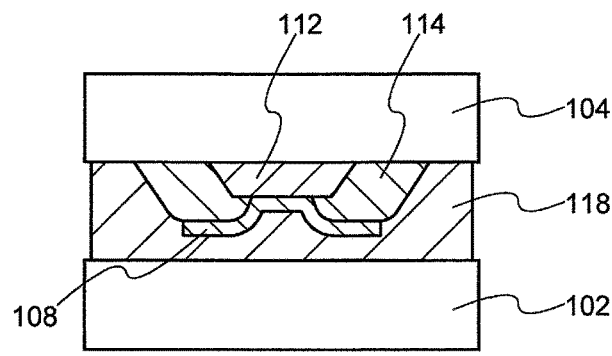
FIG. 9C is a cross-sectional view of a part corresponding to a line C-D shown in FIG. 9A.

Next, the display device shown in FIG. 8 is described in detail with reference to FIGS. 9A, 9B and 9C. FIG. 9A shows an enlarged view of a region A2 surrounded by an alternate long and short dash line in FIG. 8. Further, cross-sectional structures corresponding to a line A-B and a line C-D indicated by alternate long and short dash lines in FIG. 9A are shown in FIG. 9B and FIG. 9C, respectively.

As shown in FIG. 9A, the dummy wiring pattern 166 is provided in such a manner as to overlap the peripheral member 116 buried in the sealing member 118. The dummy wiring pattern 166 is configured to include a metal layer 112' formed by the same metal layer as the first output wiring 112 and a conductive layer 108' formed by the same layer as the first electrode pattern 108. FIG. 9C shows a structure of the first output wiring 112, and this structure is the same as that shown in FIG. 2C. Moreover, as shown in FIG. 9B, in a region where no output wiring is provided, the dummy wiring pattern 166, which has the same structure as the output wiring, is provided in such a manner as to be buried in the sealing member 118.

Since not only the peripheral member 116 but also the dummy wiring pattern 166, which has the same structure as the first output wiring 112, are provided in such a manner as to be buried in the sealing member 118, the form of the region where the sealing member 118 can be made uniform in the region where the first output wiring 112 is provided and in the other regions. It should be noted that the other advantageous effects are the same as those which are brought about by the display device 100 described with reference to FIG. 1 through FIG. 7.

By thus causing the peripheral member 116 to have a laminated structure that is substantially the same as the laminated structure of the first output wiring 112, the protective insulating layer 114, and the first electrode pattern 108, the same laminated structures are buried in the region where the sealing member 118 overlaps the first output wiring 112 and in the other regions, so that the seal part can be made uniform.

Embodiment 2

Figure 10:
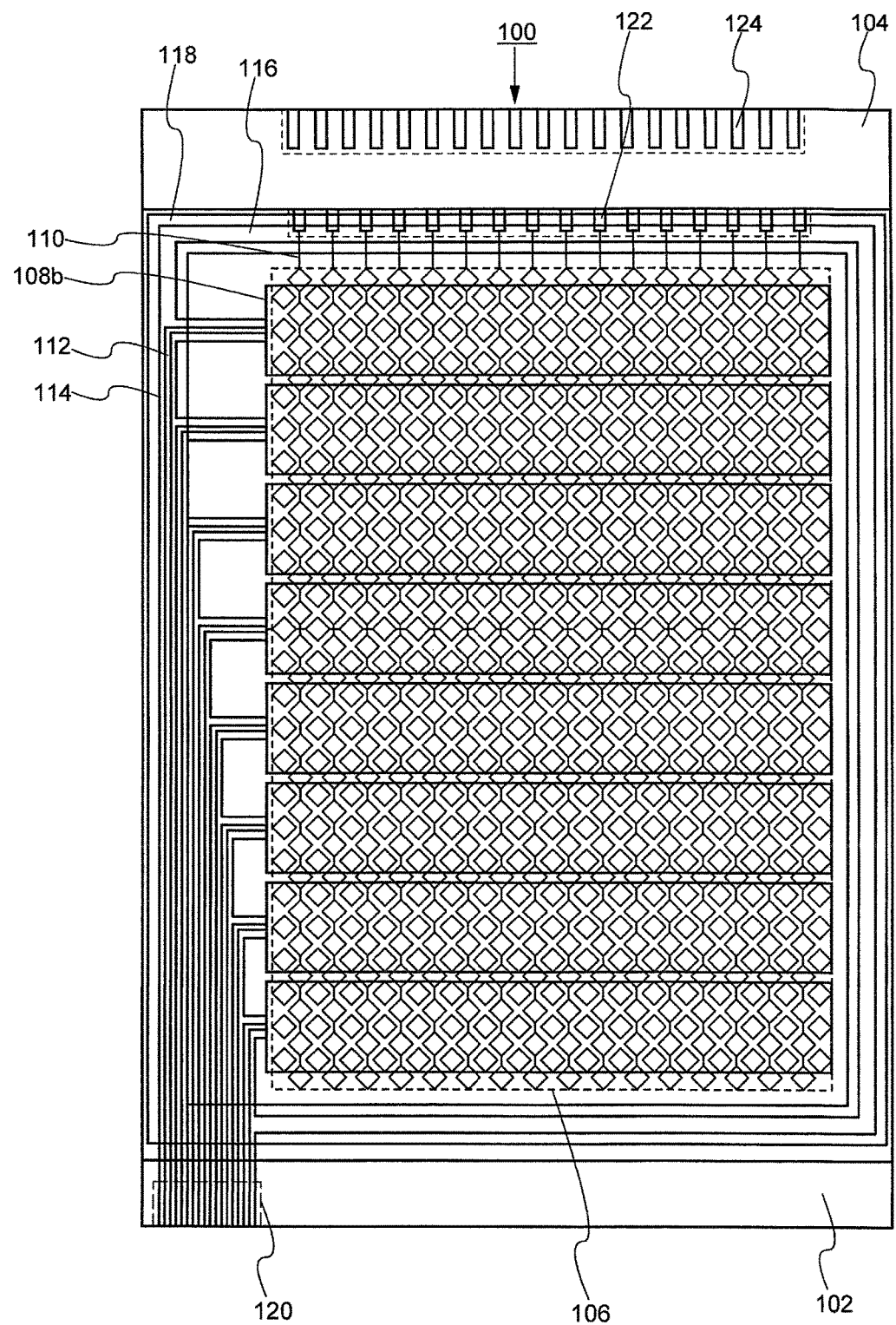
FIG. 10 is a diagram showing a configuration of a display device according to an embodiment of the present invention.

The present embodiment exemplifies a display device whose sensing unit has different electrode morphology. FIG. 10 shows a display device 100 whose sensing unit 106 has an electrode morphology which is different from that described in Embodiment 1. The sensing unit 106 is provided with a first electrode pattern 108b and a second electrode pattern 110. In the present embodiment, one of the electrode patterns is formed in a rougher pattern (larger pattern) than the other electrode pattern.

FIG. 10 exemplifies an aspect in which the first electrode pattern 108b is formed in a larger pattern than the second electrode pattern 110. The first electrode pattern 108b is a rectangular pattern which is larger in area than the second electrode pattern 110. On the other hand, the second electrode pattern 110 has a configuration of rhombic electrodes tightly arranged at regular intervals.

By forming the first electrode pattern 108b in such a manner, the resistance of the electrodes per se can be lowered. Moreover, since the first electrode pattern 108b needs only be provided in such a manner as to simply overlap the second electrode pattern 110, the precision with which the electrodes are put together can be reduced.

Figure 11:
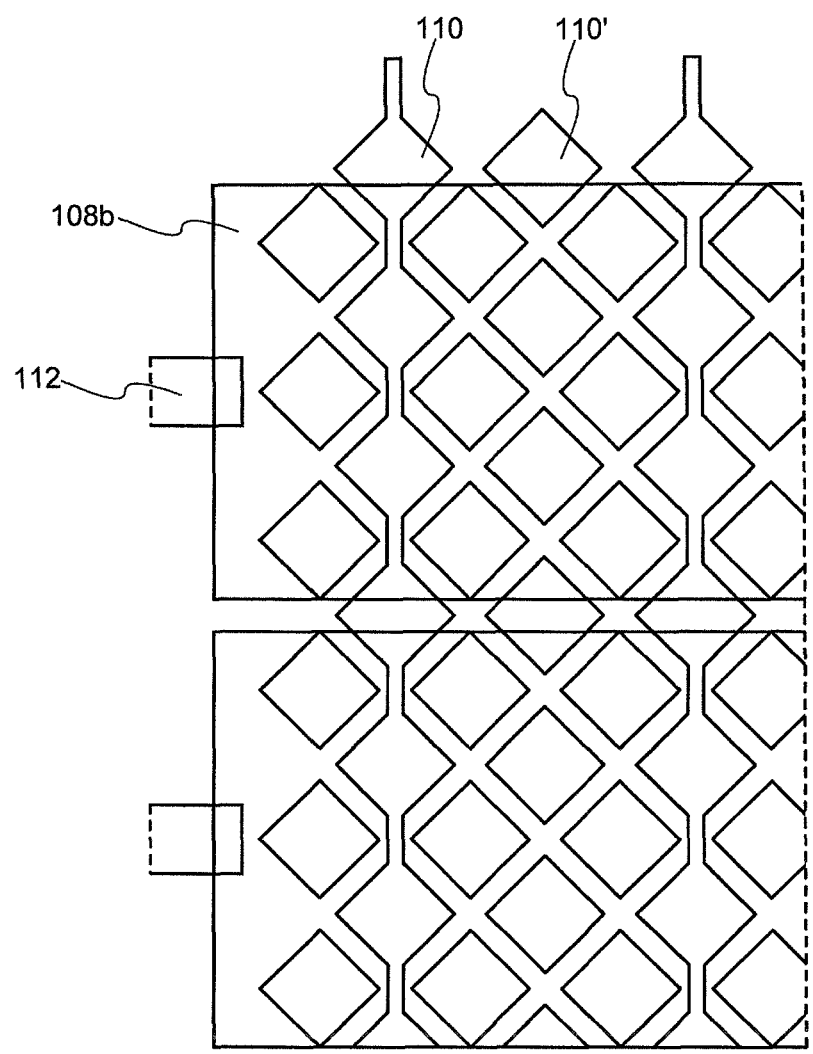
FIG. 11 is a diagram showing an example configuration of electrodes in a sensing unit.

FIG. 11 shows the first electrode pattern 108b and the second electrode pattern 110 in detail. The larger area of the first electrode pattern 108b allows the first electrode pattern 108b to make contact with the first output wiring 112 in a larger area of contact, thus making it possible to reduce interconnection resistance. It should be noted that from a point of view of visibility, it is preferable that a dummy pattern 110' made of the same material as the second electrode pattern 110 be provided in an area around the second electrode pattern 110. For example, when the second electrode pattern 110 is provided in the form of a pattern of rhombic electrodes placed at regular intervals, the dummy pattern 110' is provided in the form of a pattern of rhombic dummies placed at substantially the same intervals in an area around the second electrode pattern 110. By thus providing the dummy pattern 110', the electrode patterns can be made invisible in terms of appearance.

In addition to the advantageous effects which are brought about by Embodiment 1, the display device of the present embodiment can achieve a reduction in the resistance of the first electrode pattern, a reduction in the interconnection resistance of the first electrode pattern with the output wiring, and a reduction in the precision with which the first electrode pattern is put together with the second electrode pattern. It should be noted that the shape of the first electrode pattern 108b is not limited to a rectangular shape, but can be any shape that is rougher in pattern than the second electrode pattern 110.

<Modification 2>

Figure 12:
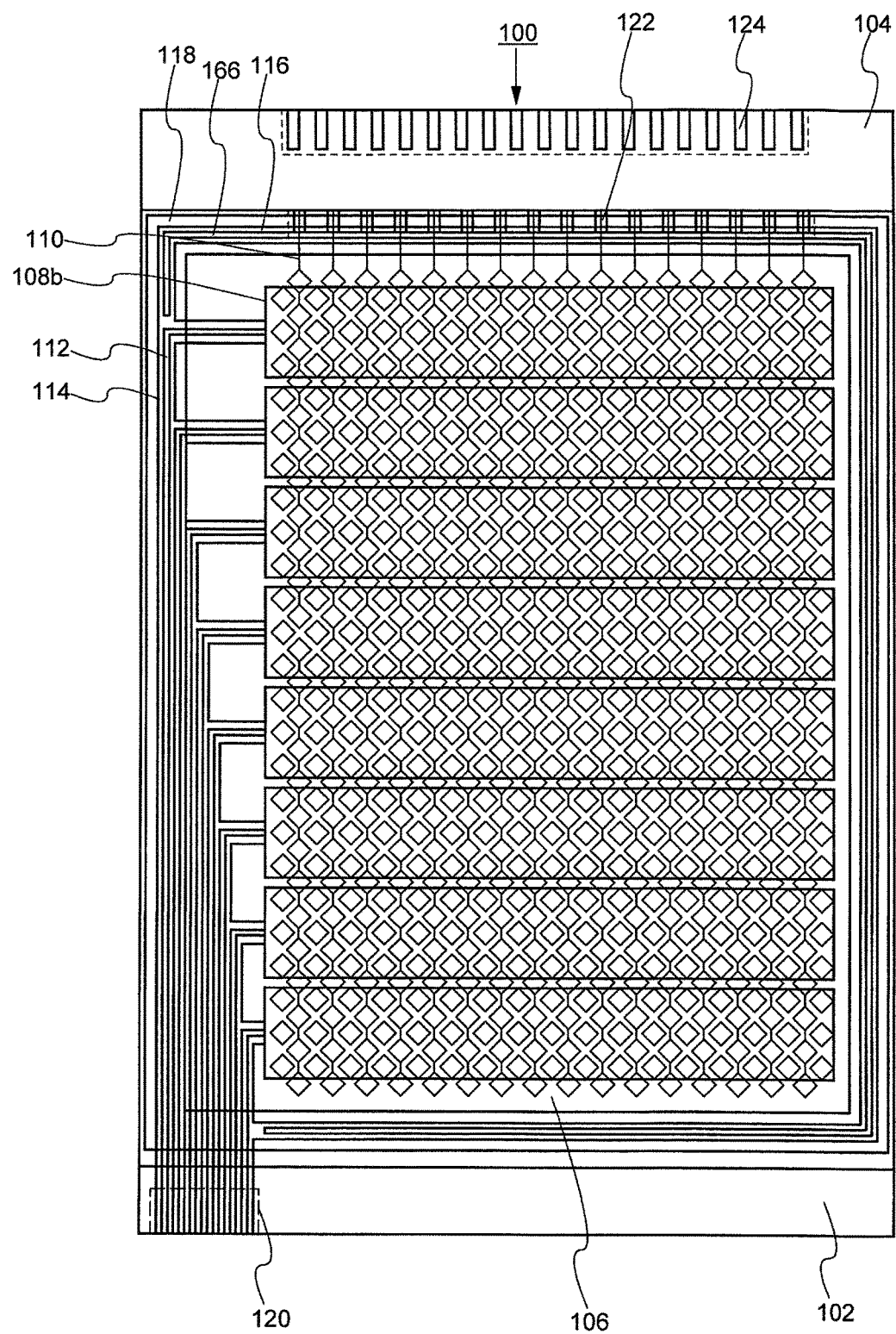
FIG. 12 is a diagram showing a configuration of a display device according to an embodiment of the present invention.

As shown in FIG. 12, the display device according to the present embodiment is configured such that in the seal part, a dummy wiring pattern 166 may be provided in such a manner as to be buried in the sealing member 118.

Since the dummy wiring pattern 166 is provided in such a manner as to be buried in the sealing member 118, the seal pattern can be easily made uniform in height in the region where the first output wiring 112 is provided and in the other regions. It should be noted that the other advantageous effects are the same as those which are brought about by the display device 100 described with reference to FIG. 10 and FIG. 12.

Embodiment 3

Figure 13:
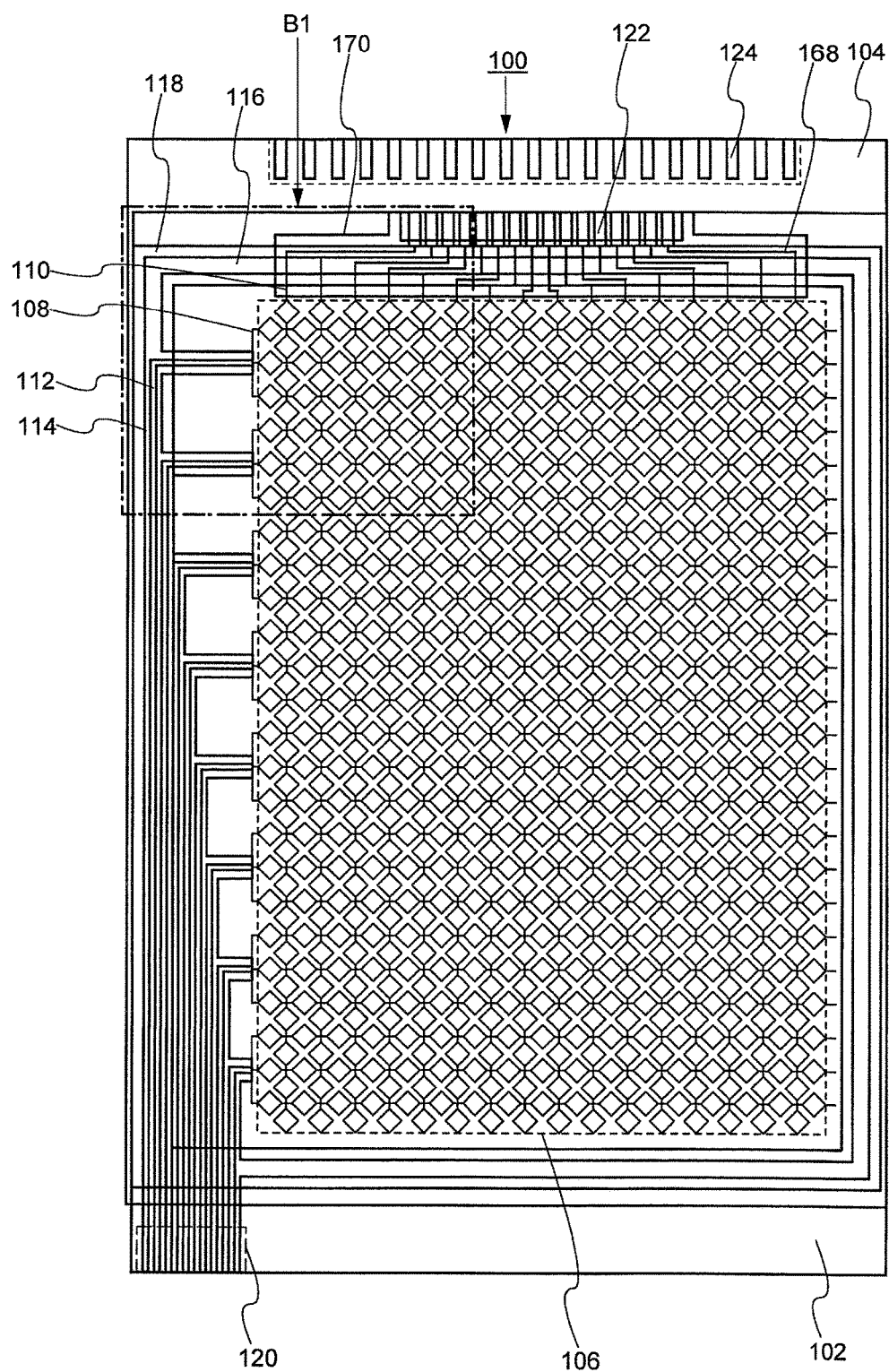
FIG. 13 is a diagram showing a configuration of a display device according to an embodiment of the present invention.

The present embodiment exemplifies a display device with a different configuration of output wirings on a translucent opposite substrate. FIG. 13 shows a configuration of a display device in which the second electrode patterns 110 are provided with second output wirings 168, respectively. That is, the display device shown in FIG. 13 has a configuration in which the second electrode patterns 110 are connected to the second output wirings 168, respectively, and are led to an edge of the translucent opposite substrate 102. Each of the second electrode patterns 110 is formed by a transparent conductive film, and each of the second output wirings 168 is low in resistance and is made of a metal material such as aluminum.

By thus connecting the second electrode pattern 110 to the second output wiring 168, the wiring resistance from the second electrode pattern 110 to the second terminal area 122 can be reduced. This makes it possible to perform high-sensitivity sensing.

Figure 14A:
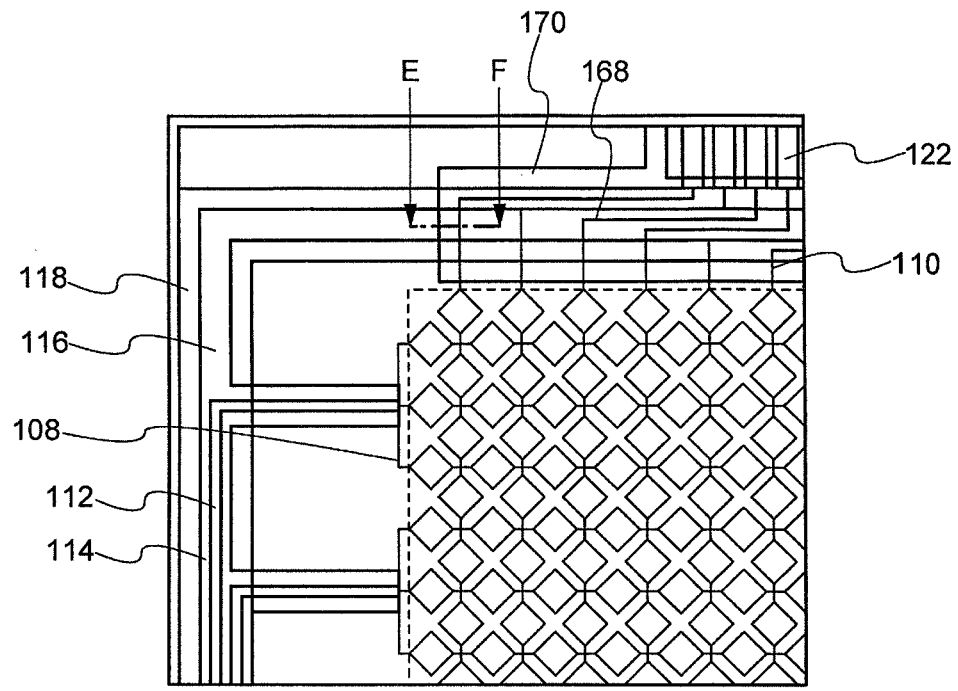
FIG. 14A is a plan view showing a configuration of a particular part of the display device shown in FIG. 13.
Figure 14B:
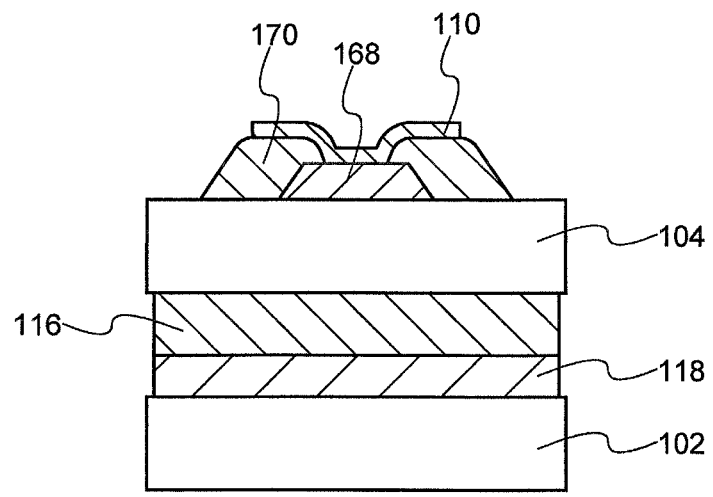
FIG. 14B is a cross-sectional view of a part corresponding to a line E-F shown in FIG. 14A.

This structure is described in detail below with reference to FIGS. 14A and 14B. FIG. 14A shows an enlarged view of a region B1 surrounded by an alternate long and short dash line in FIG. 13. Further, FIG. 14B shows a cross-sectional structure corresponding to an E-F line indicated by an alternate long and short dash line in FIG. 2A.

The second output wiring 168 of the second electrode pattern 110 is provided over the surface opposite to a surface of the translucent opposite substrate 102 on which the sealing member 118 is provided. The second output wiring 168 extends from a region where the second electrode pattern 110 is provided toward an edge of the translucent opposite substrate 102. Side surfaces and upper corners of the second output wiring 168 are covered by a protective insulating layer 170. Moreover, the protective insulating layer 170 has an opening through which an upper surface of the second output wiring 168 is exposed. The second electrode pattern 110 is formed along a surface of the protective insulating layer 170, and makes contact with the second output wiring 168 through the opening to form an electrical connection. It is preferable here that the protective insulating layer 170 have a cross-sectional shape having inclined surfaces (tapered shapes), instead of having a cross-sectional shape having a stepped bump. It should be noted that the protective insulating layer 170 can be formed by a film of an inorganic insulating material such as silicon oxide or silicon nitride; however, it is preferable that the protective insulating layer 170 be formed by an organic resin material is used to forming to such a shape.

By interposing the protective insulating layer 170 in connecting the second electrode pattern 110 to the second output wiring 168, the electrical connection can be ensured. Since the protective insulating layer 170 can be provided in such a manner as to bury a plurality of second output wirings 168, the degree of integration of second output wirings 168 does not need to be lowered even if the protective insulating layer 170 has its side edges tapered. Further, since the insulating layer 172 serves as a protective film for the second output wirings 168, the second output wirings 168 can be prevented from being broken due to a flow and from being corroded by moisture.

Figure 15:
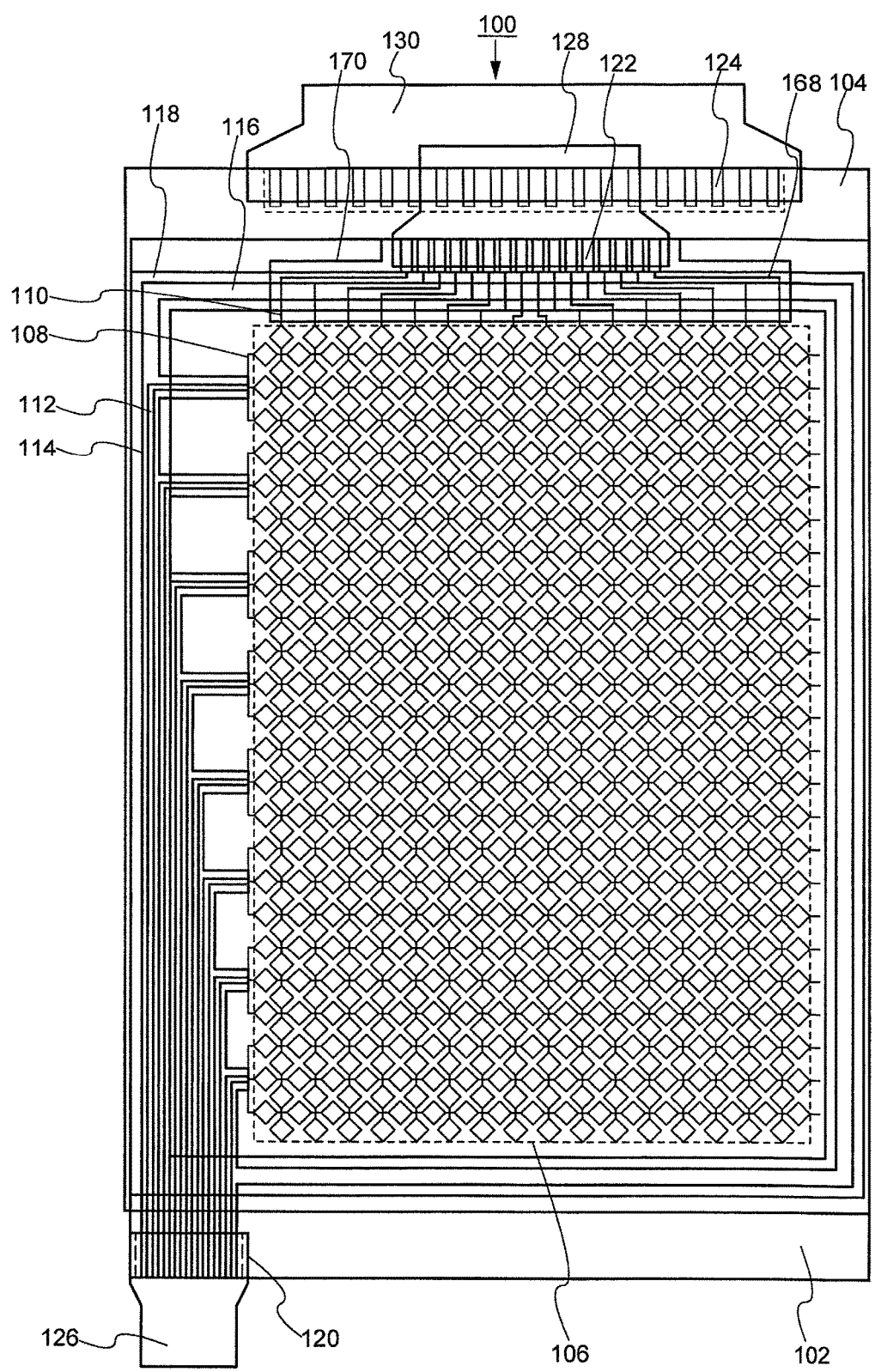
FIG. 15 is a diagram showing a configuration of a display device according to an embodiment of the present invention.

FIG. 15 shows an aspect of a module in which flexible printed circuits are attached to the display device 100 shown in FIG. 13. Further, FIG. 16 shows a cross-sectional schematic view of the module shown in FIG. 15.

In FIG. 15, a first FPC substrate 126 that is electrically connected to the first electrode patterns 108 and a second FPC substrate 128 that is electrically connected to the second electrode patterns 110 are attached to the translucent opposite substrate 102. Further, a third FPC substrate 130 is attached to the element substrate 104.

Figure 16:
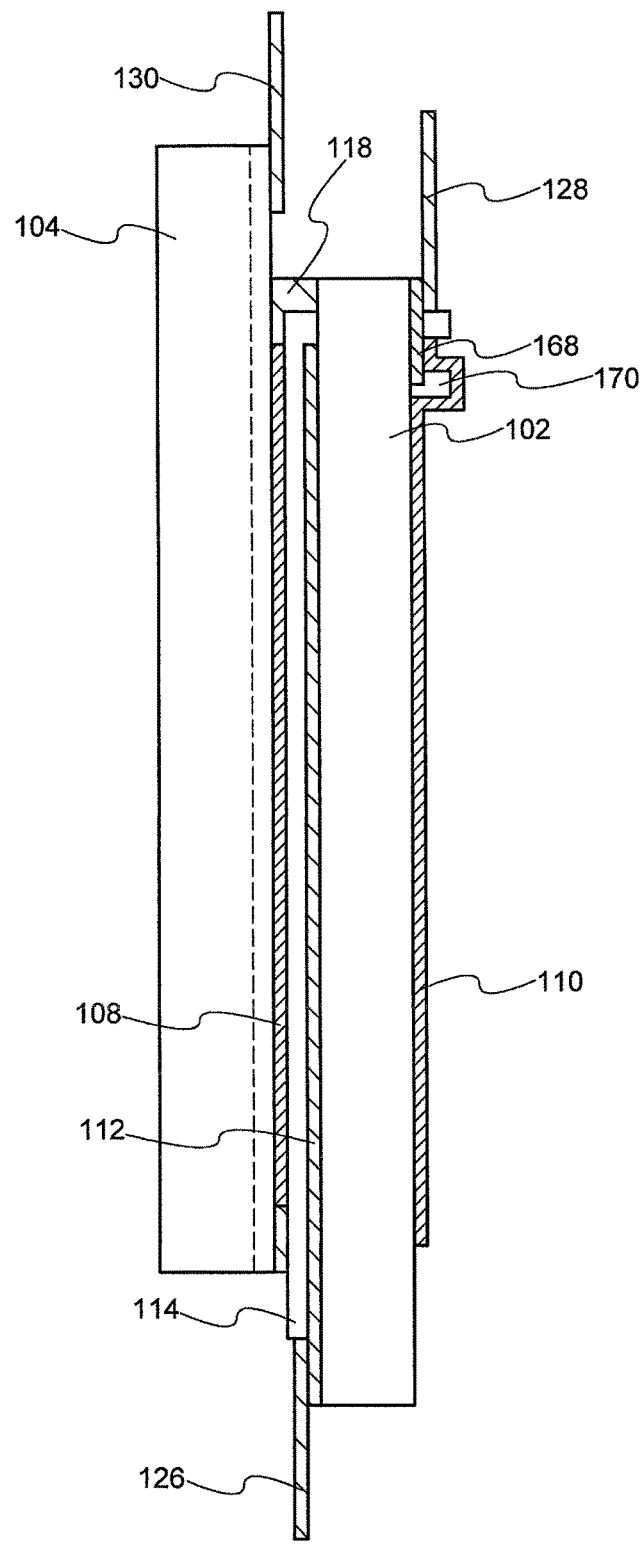
FIG. 16 is a diagram showing a configuration of a display device according to an embodiment of the present invention.

It should be noted that as shown in FIG. 16, the first electrode patterns 108 are provided over the surface of the translucent opposite substrate 102 that faces toward the element substrate 104 and the second electrode patterns 110 are provided over the surface of the translucent opposite substrate 102 that faces away from the element substrate 104. For this reason, the flexible printed circuits are attached to different positions and surfaces, respectively. However, the second electrode patterns 110 are connected to the second output wirings 168 and therefore have reduced wiring resistance until they are connected to the second FPC substrate 128. Further, the second output wirings 168 are protected by the protective insulating layer 170 provided over the translucent opposite substrate 102.

In the preset embodiment, by providing outputs wiring that leads the second electrode patterns 110 to the second terminal area 122, the wirings can be routed without being affected by wiring resistance. By connecting the second electrode patterns 110 to the second output wirings 168 and further connecting the second electrode patterns 110 to the second FPC substrate 128, the time constant at the time of signal detection becomes smaller. This makes it possible to improve detection signal sensitivity (S/N ratio). Further, the output terminals can be concentrated in a particular position (in FIG. 15, a central part) on the translucent opposite substrate 102. This makes it possible to make the width of the second FPC substrate 128 with respect to the second electrode patterns 110 narrower.

The other components of the present embodiment are the same as those of Embodiment 1, and can bring about the same working effects in the display device according to the present embodiment. It should be noted that as shown in FIG. 8, a dummy wiring pattern may be provided in such a manner as to be buried in the sealing member.

<Modification 3>

Figure 17:
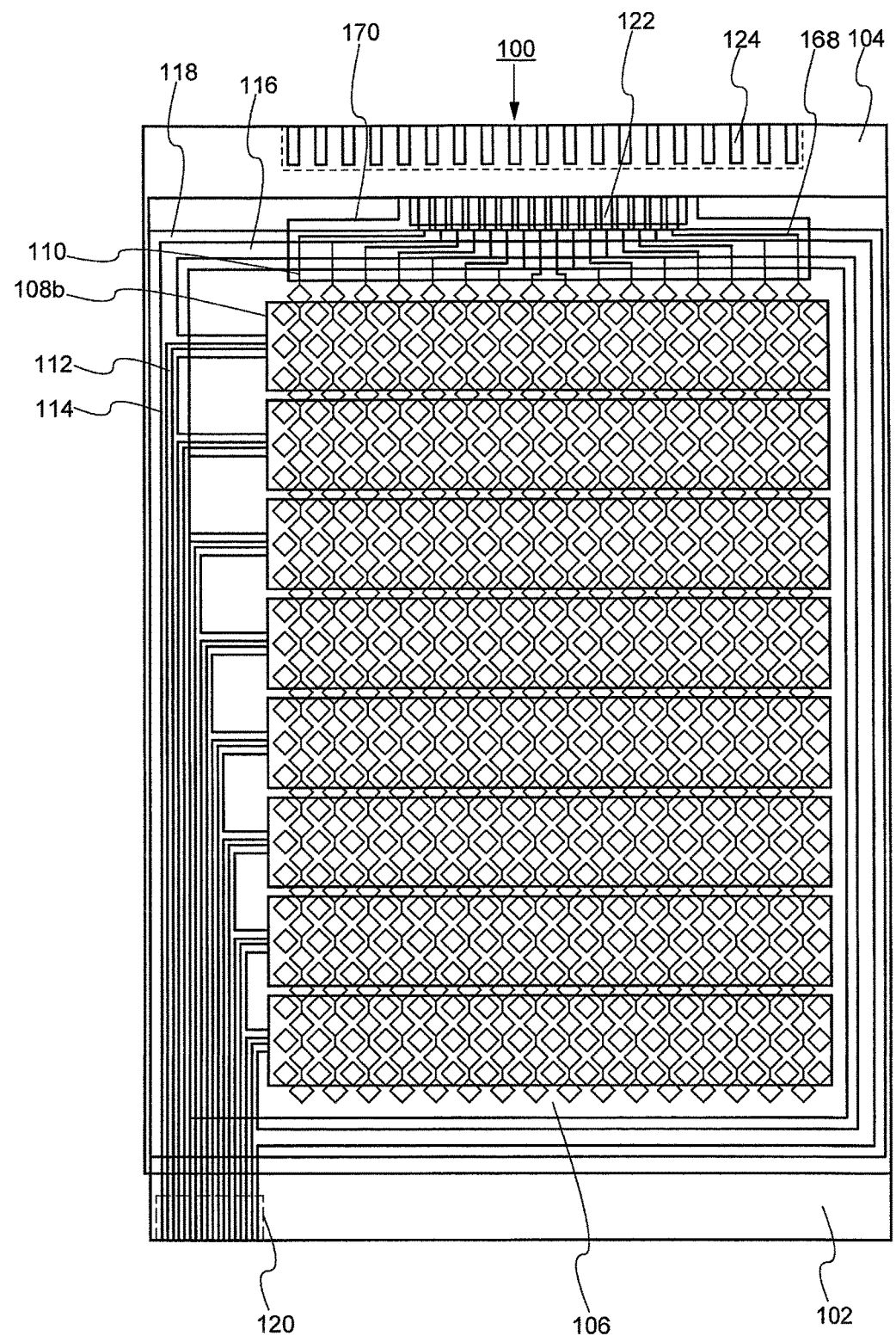
FIG. 17 is a diagram showing a configuration of a display device according to an embodiment of the present invention.

FIG. 17 shows a display device whose sensing unit 106 has an electrode morphology which is different from that described in Embodiment 3. The sensing unit 106 is provided with a first electrode pattern 108b and a second electrode pattern 110. In the display device shown in FIG.

17, as in Embodiment 2, one of the electrode patterns is formed in a rougher pattern (larger pattern) than the other electrode pattern.

For example, FIG. 17 shows an aspect in which the first electrode pattern 108b is provided in a larger pattern than the second electrode pattern 110. The first electrode pattern 108b is an oblong pattern which is larger in area than the second electrode pattern 110. On the other hand, the second electrode pattern 110 has a configuration of rhombic electrodes tightly arranged at regular intervals.

By forming the first electrode pattern 108b in such a manner, the resistance of the electrodes per se can be lowered. Further, the precision with which the first electrode pattern 108b is put together with the second electrode pattern 110 can be greatly reduced. In addition, the wiring resistance from the second electrode pattern 110 to the second terminal area 122 can be reduced. This makes possible to improve detection signal sensitivity (S/N ratio).

The other components of the present embodiment are the same as those of Embodiment 1, and can bring about the same working effects in the display device according to the present embodiment. It should be noted that as shown in FIG. 8, a dummy wiring pattern may be provided in such a manner as to be buried in the sealing member.

Embodiment 4

Figure 18:
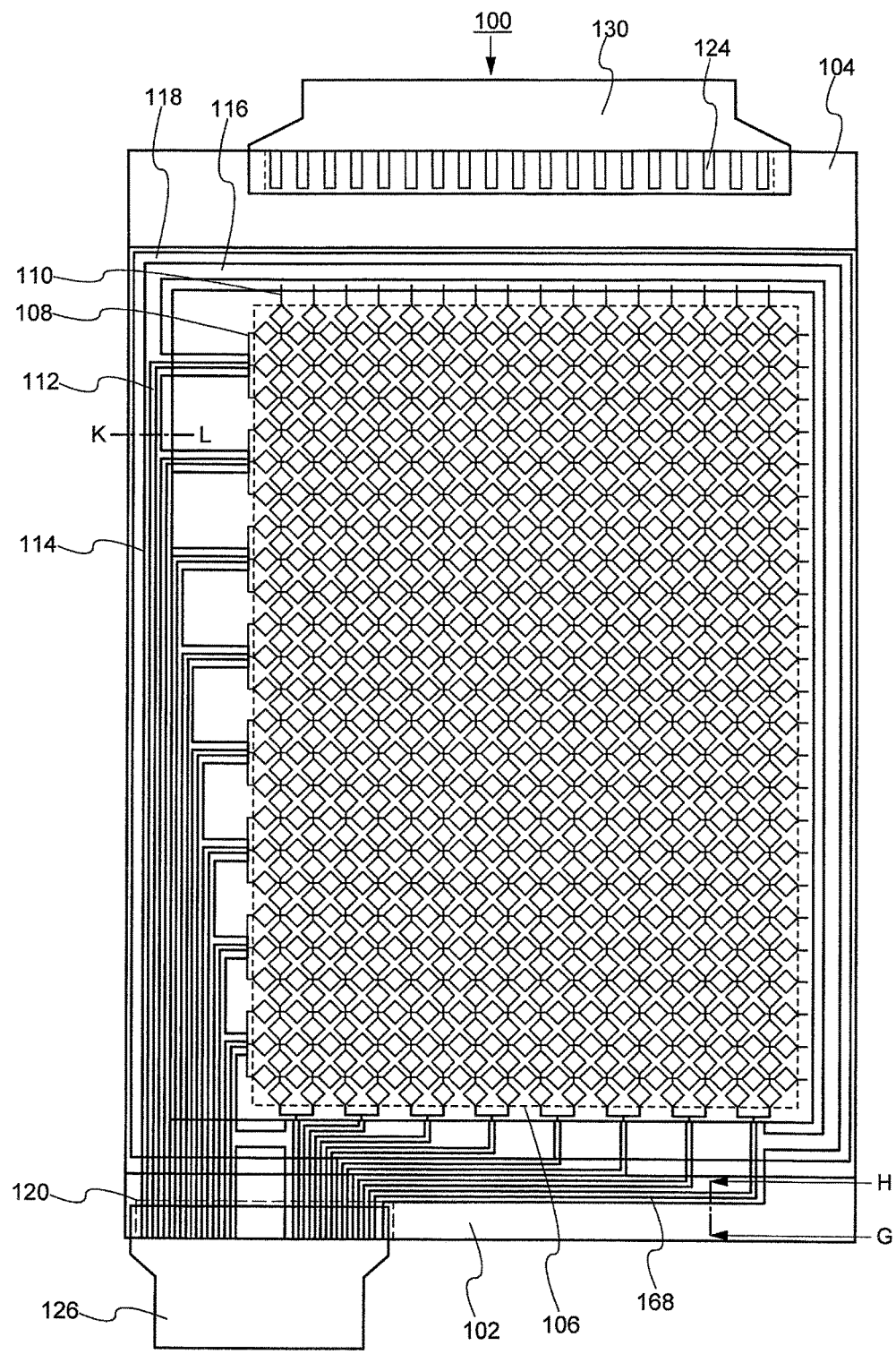
FIG. 18 is a diagram showing a configuration of a display device according to an embodiment of the present invention.

The present embodiment exemplifies a display device in which the first electrode patterns and the second electrode patterns are both provided on one surface of the translucent opposite substrate. FIG. 18 shows an overview of a display device 100 according to the present embodiment.

In the sensing unit 106, the first electrode patterns 108 and the second electrode patterns 110 are arranged in such a manner as to intersect each other. The first electrode patterns 108 are connected to the first output wirings 112, respectively. The first output wirings 112 are integrated at a peripheral part of the translucent opposite substrate 102, and are connected to the first terminals 120 provided at an edge of the translucent opposite substrate 102. Further, the first output wirings 112 are protected by the protective insulating layer 114, which is provided in accordance with the seal pattern formed by the sealing member 118. These components are the same as those of Embodiment 1.

The first electrode patterns 108 are provided on one surface of the translucent opposite substrate 102. Further, the second electrode patterns 110 are provided over the same surface as the surface on which the first electrode patterns 108 are provided. The first electrode patterns 108 and the second electrode patterns 110 are provided in such a manner as to intersect each other, with an insulting layer 172 provided therebetween so that the electrodes do not make direct contact with each other.

In such an arrangement of electrodes, the second output wirings 168 corresponding to the second electrode patterns 110 can be formed in the same step as the first output wirings 112 corresponding to the first electrode patterns 108. Since this makes it possible to discount the effect of the wiring resistance of the second output wirings 168 with respect to the second electrode patterns 110, the output terminal area corresponding to the second electrode patterns 110 can be provided in a place near the output terminals of the first electrode patterns 108. This makes it possible to a single first FPC substrate 126 to the output terminals instead of needing to connect two separate FPC substrates to the output terminals.

Figure 19:
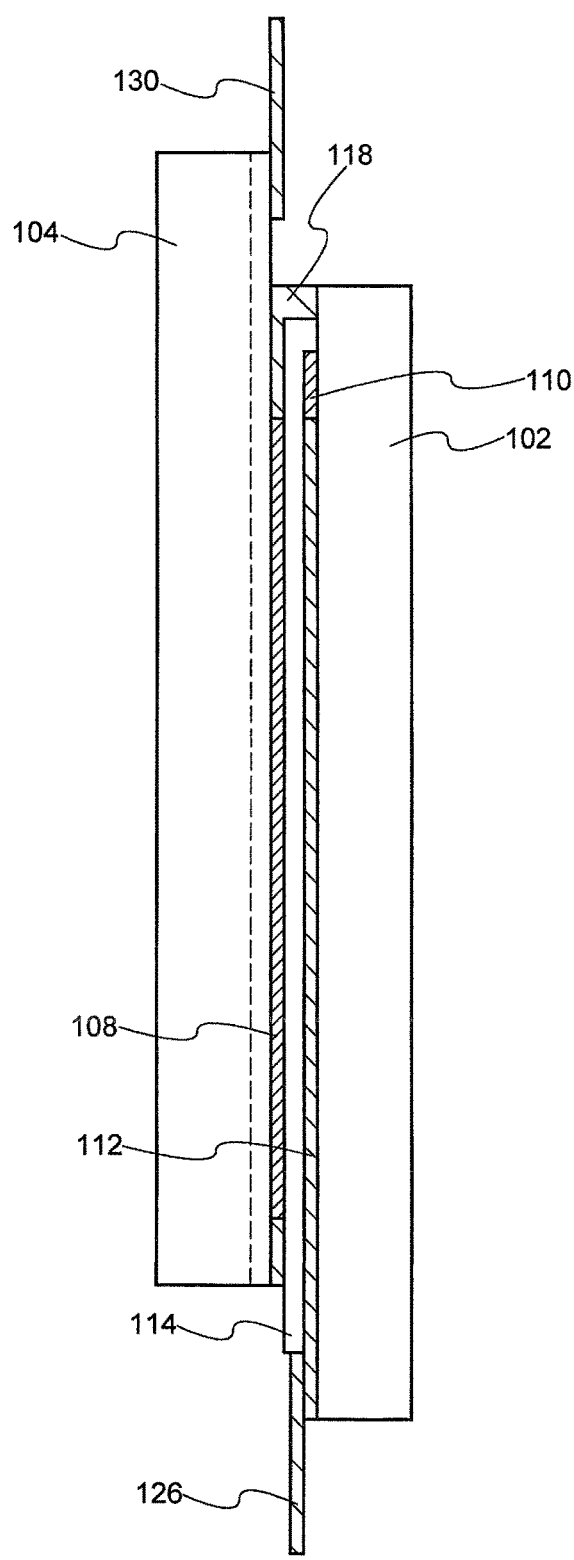
FIG. 19 is a diagram showing a configuration of a display device according to an embodiment of the present invention.

FIG. 19 is a cross-sectional schematic view of the display device shown in FIG. 18. As shown in FIG. 19, a first electrode pattern 108 and a second electrode pattern 110 are provided over the same surface of the translucent opposite substrate 102 that faces toward the element substrate 104. Moreover, the insulating layer 172 is provided between the first electrode pattern 108 and the second electrode pattern 110 so that the first electrode pattern 108 and the second electrode pattern 110 do not make direct contact with each other.

Figure 20:
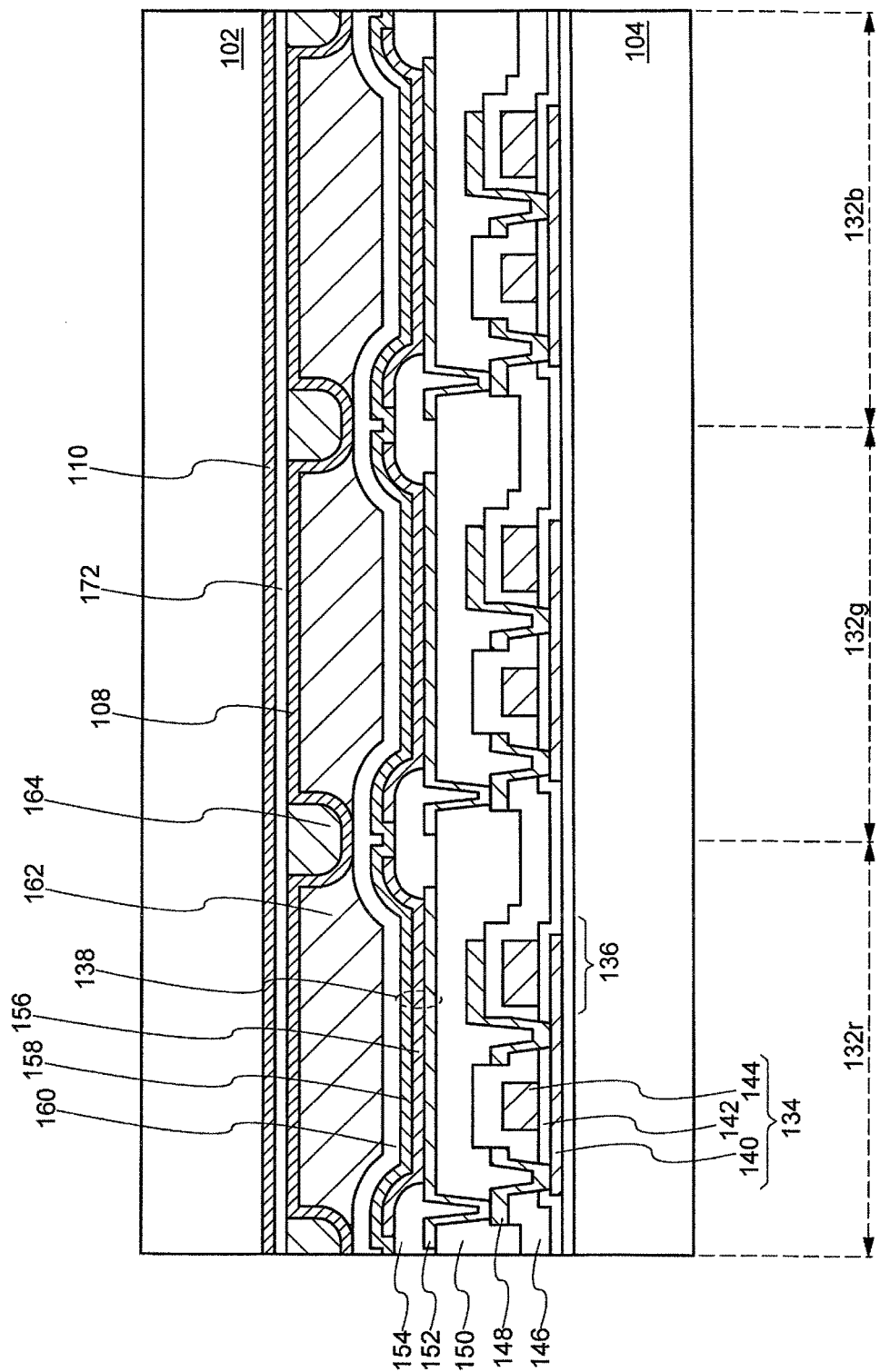
FIG. 20 is a diagram showing an example of a pixel unit in a display device according to an embodiment of the present invention.

FIG. 20 shows details of the pixel unit in the display device of the present embodiment. FIG. 20 shows a cross-sectional structure of a first pixel 132r, a second pixel 132g, and a third pixel 132b. The configuration of the transistor 134, the storage capacitor 136, and the light-emitting element 138 in each of the pixels is the same as that shown in FIG. 6.

In FIG. 20, the translucent opposite substrate 102 is provided with a first electrode pattern 108 and a second electrode pattern 110 with the insulating layer 172 sandwiched therebetween. Since the first electrode pattern 108 and the second electrode pattern 110, which are for use in sensing, are provided inside of the pixel unit, the base material for the translucent opposite substrate 102 per se serves as a protective member, thus making it possible to omit to provide a protective film against a flaw or the like. By thus providing the electrodes forming the sensing unit 106 inside of a cell in the display device, a reduction in thickness can be achieved.

In FIG. 20, the spacers 164 are provided between the element substrate 104 and the translucent opposite substrate 102. The spacers 164 can be formed together with the protective insulating layer 114 of the first output wirings 112. Further, the filling material 162 can be provided between the element substrate 104 and the translucent opposite substrate 102.

Next, a process for fabricating a first pattern electrode 108, a first output wiring 112, a second electrode pattern 110, and a second output wiring 168 over the translucent opposite substrate 102 is described with reference to FIG. 21A to 21D and FIG. 22A to 22D. It should be noted that FIG. 21A to 21D is a cross-sectional view taken along an alternate long and short dash line G-H shown in FIG. 18, and corresponds to a second electrode pattern 110 and a second output wiring 168. Further, FIG. 22A to 22D is a cross-sectional view taken along an alternate long and short dash line K-L shown in FIG. 18, and corresponds to a first electrode pattern 108 and a first output wiring 112.

Figure 21A:
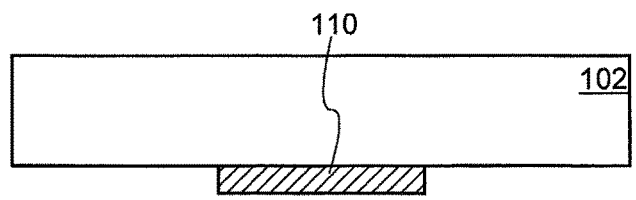
FIG. 21A is a diagram showing a step of manufacturing a display device according to an embodiment of the present invention.
Figure 21B:
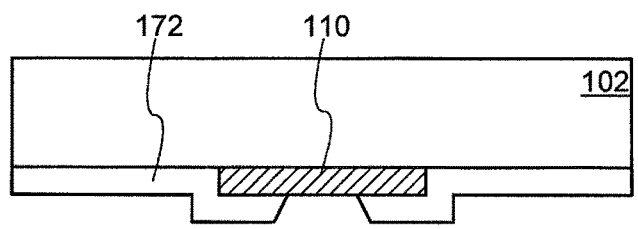
FIG. 21B is a diagram showing a step of manufacturing a display device according to an embodiment of the present invention.

FIG. 21A shows a step of forming a second electrode pattern 110 on the base material for the translucent opposite substrate 102. The second electrode pattern 110 is formed by a transparent conductive film in a pattern of rhombic electrodes, for example, as shown in FIG. 3. FIG. 21B shows a step of forming an insulating layer 172 over the second electrode pattern 110. It is preferable that the insulating layer 172 be formed by an organic insulating material such as a silicon oxide film or a silicon nitride film. Moreover, the insulating layer 172 has an opening on the second electrode pattern 110.

Figure 21C:
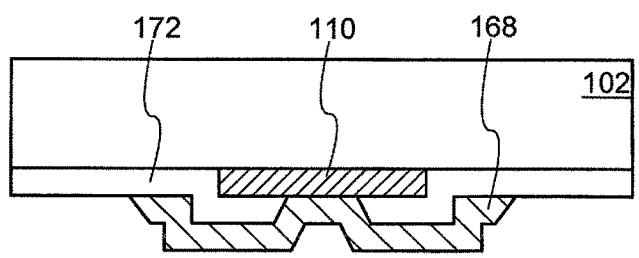
FIG. 21C is a diagram showing a step of manufacturing a display device according to an embodiment of the present invention.
Figure 21D:
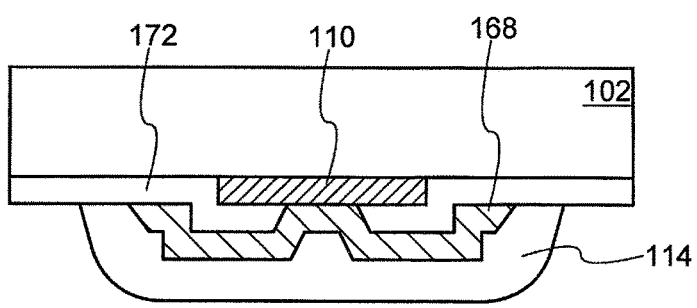
FIG. 21D is a diagram showing a step of manufacturing a display device according to an embodiment of the present invention.

FIG. 21C shows a step of fabricating of the second output wiring 168. The second output wiring 168 is formed over the insulating layer 172, and is brought into contact with the second electrode pattern 110 through the opening. FIG. 21D shows a step of forming a protective insulating layer 114 covering the second output wiring 168. This is how the second electrode patterns 110 and the second output wirings 168 can be fabricated.

Figure 22A:
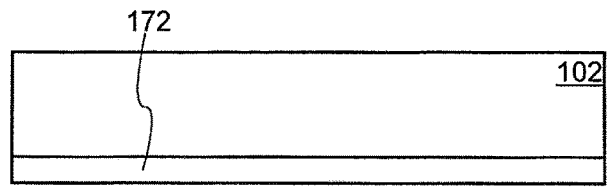
FIG. 22A is a diagram showing a step of manufacturing a display device according to an embodiment of the present invention.
Figure 22B:
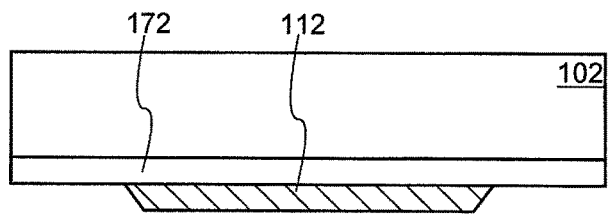
FIG. 22B is a diagram showing a step of manufacturing a display device according to an embodiment of the present invention.

Meanwhile, the first electrode patterns 108 and the first output wirings 112 are fabricated in the same process as shown in FIG. 22A through FIG. 22D. In FIG. 22A, an insulating layer 172 is formed over the base material for the translucent opposite substrate 102. Then, as shown in FIG. 22B, a first output wiring 112 is formed over the insulating layer 172. The side edges of the first output wirings 112 are processed, preferably, into tapered shapes.

Figure 22C:
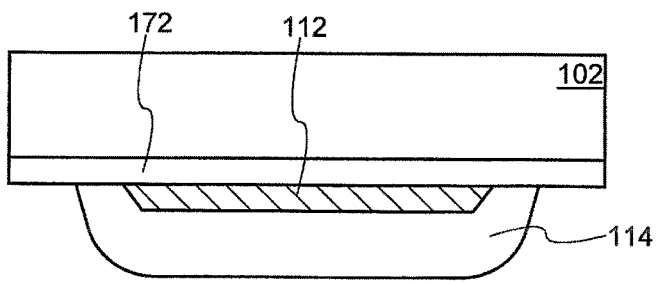
FIG. 22C is a diagram showing a step of manufacturing a display device according to an embodiment of the present invention.
Figure 22D:
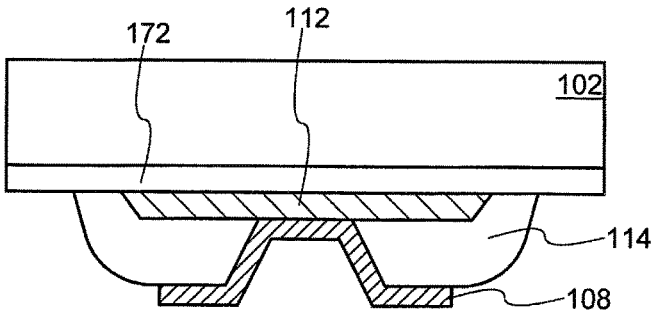
FIG. 22D is a diagram showing a step of manufacturing a display device according to an embodiment of the present invention.

FIG. 22C shows a step of forming a protective insulating layer 114 over the first output wiring 112. The protective insulating layer 114 is formed in such a manner as to cover the first output wiring 112. Further, at the same time, an opening is formed over the first output wiring 112. It should be noted that it is preferable that the edges of the protective insulating layer 114 be formed in such a manner as to have inclined surfaces. After that, as shown in FIG. 22D, a first electrode pattern 108 is formed by a transparent conductive film. The first electrode pattern 108 is formed in such a manner as to make contact with the first output wiring 112 through the opening. This is how the first electrode patterns 108 and the first output wirings 112 can be fabricated.

According to FIG. 21A to 21D and FIG. 22A to 22D, the first electrode patterns 108 and the second electrode patterns 110 can be fabricated on difference insulating surfaces through the same process as the first output wirings 112 and the second output wirings 168.

The present embodiment makes it possible to protect the output wirings while providing the first electrode patterns and the second electrode patterns, which together form the sensing unit, inside of the space between the translucent opposite substrate and the element substrate, and to make durable the seal part formed by the sealing member.

<Modification 4>

Figure 23:
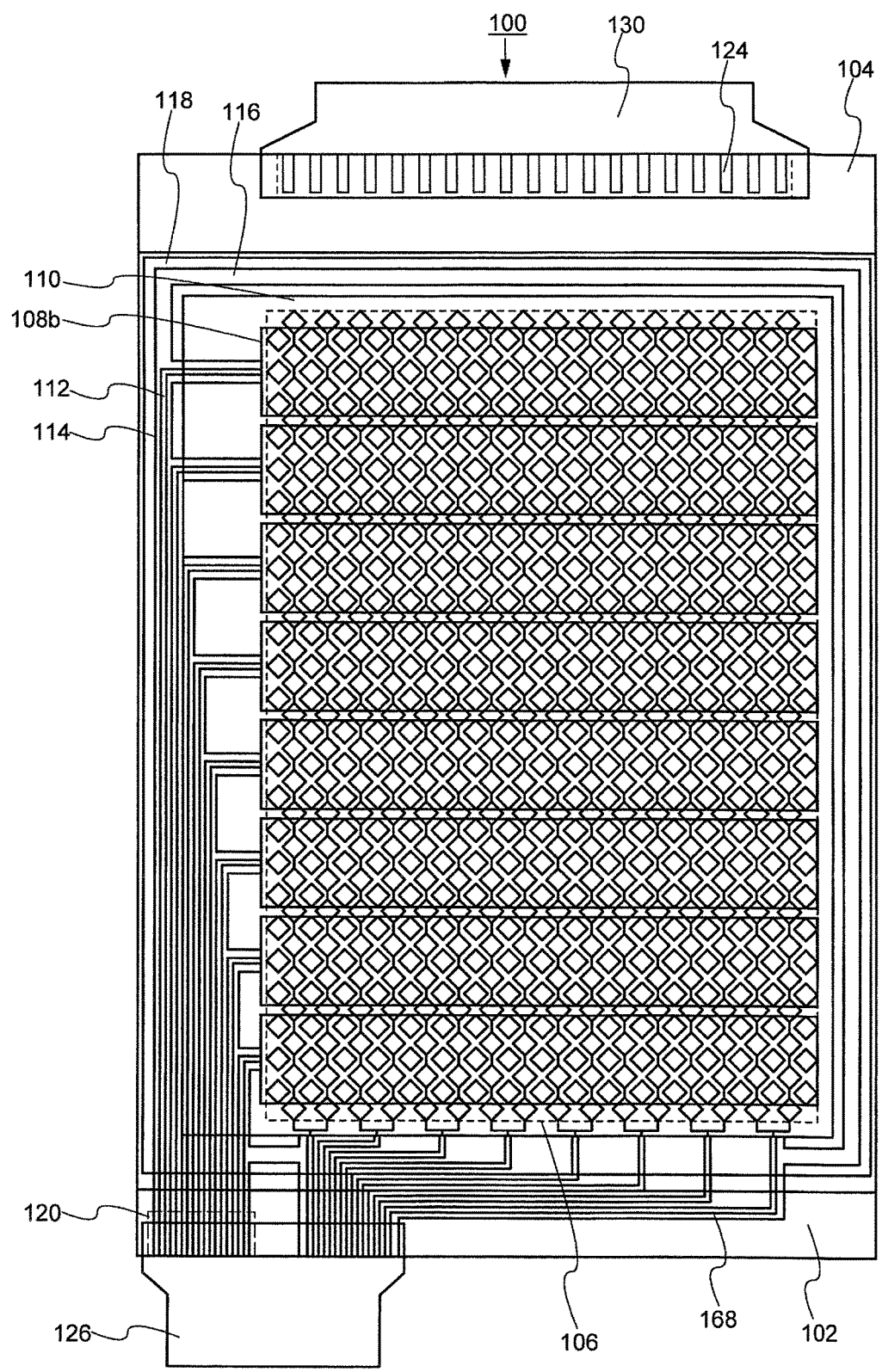
FIG. 23 is a diagram showing a configuration of a display device according to an embodiment of the present invention.

FIG. 23 shows a display device whose sensing unit 106 has an electrode morphology which is different from that shown in FIG. 18. The sensing unit 106 is provided with a first electrode pattern 108b and a second electrode pattern 110. In the display device shown in FIG. 23, as in Embodiment 2, one of the electrode patterns is formed in a rougher pattern (larger pattern) than the other electrode pattern.

For example, FIG. 23 shows an aspect in which the first electrode pattern 108b is provided in a larger pattern than the second electrode pattern 110. The first electrode pattern 108b is an oblong pattern which is larger in area than the second electrode pattern 110. On the other hand, the second electrode pattern 110 has a configuration of rhombic electrodes tightly arranged at regular intervals.

By forming the first electrode pattern 108b in such a manner, the resistance of the electrodes per se can be lowered. Further, the precision with which the first electrode pattern 108b is put together with the second electrode pattern 110 can be greatly reduced. In addition, the wiring resistance from the second electrode patterns 110 to the output terminals can be reduced.

The other components of the present embodiment are the same as those of Embodiment 1, and can bring about the same working effects in the display device according to the present embodiment. It should be noted that as shown in FIG. 8, a dummy wiring pattern may be provided in such a manner as to be buried in the sealing member.

Embodiment 5

Figure 24:
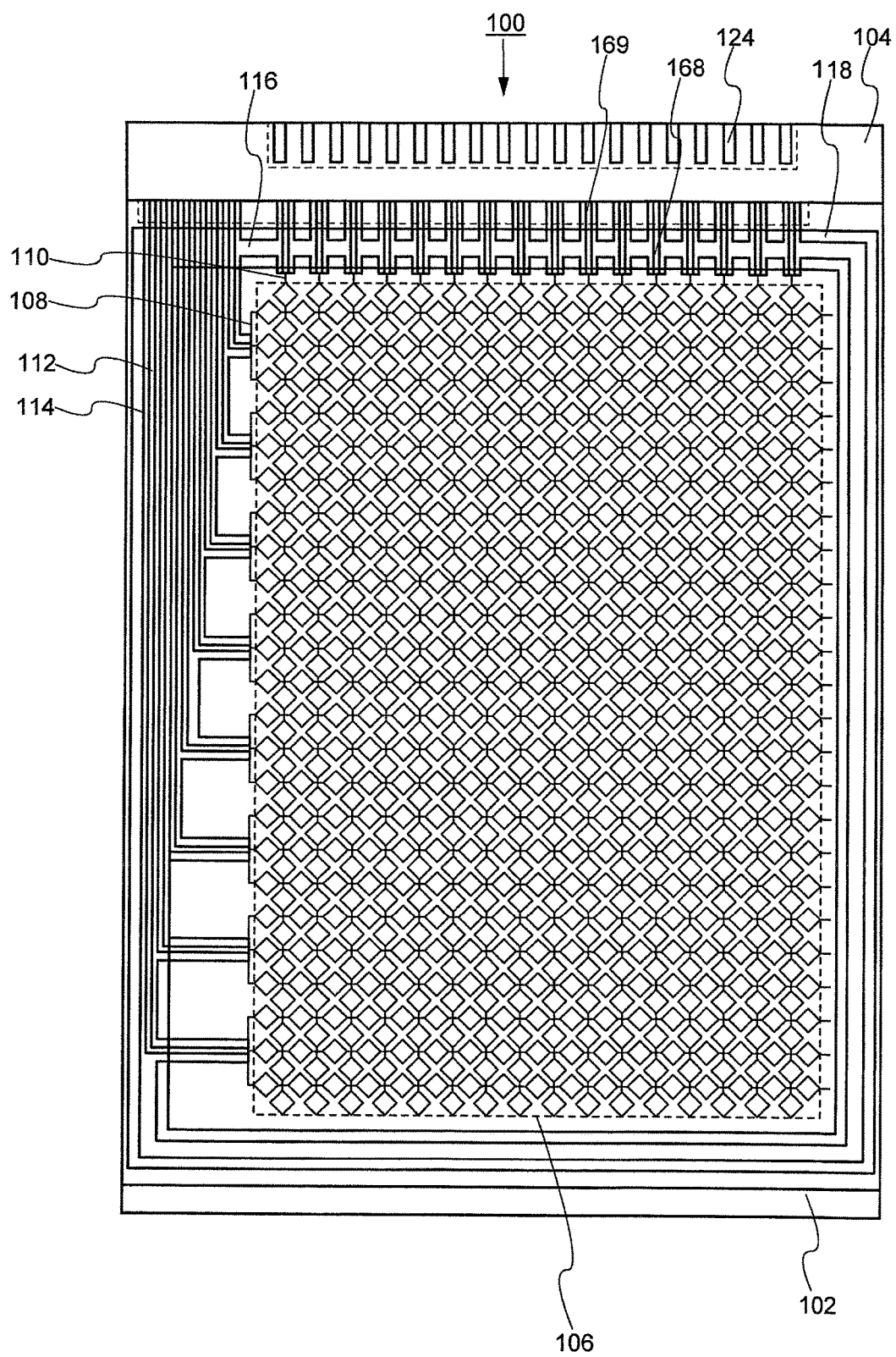
FIG. 24 is a diagram showing a configuration of a display device according to an embodiment of the present invention.

The present embodiment exemplifies a configuration of a display device in which the output terminals of the first electrode patterns 108 and those of the second electrode patterns 110 are provided in positions on a side of the element substrate. FIG. 24 shows a configuration of a display device according to the present embodiment.

In FIG. 24, the element substrate 104 is provided with first terminals 168. The translucent opposite substrate 102 is provided with the first electrode patterns 108 and the second electrode patterns 110, which together form the sensing unit 106. The first electrode patterns 108 are connected to the first output wirings 112, respectively, and the second electrode patterns 110 are connected to the second output wirings 168, respectively. It should be noted here that as described in Embodiment 4, the first electrode patterns 108 and the second electrode patterns 110 are provided over the surface of the translucent opposite substrate 102 that faces toward the element substrate 104.

The first output wirings 112 and the second output wirings 168 are disposed in such a manner as to be led to an edge of the translucent opposite substrate 102. In a region at the edge of the translucent opposite substrate 102, an output terminal area 169 having points of contact with the element substrate is provided. FIG. 24 shows an aspect in which the output terminal area 169 is provided over the side that is closer to a first terminal area 124 of the element substrate 104. However, the position of the output terminal area 169 is not limited to this place, but can be provided in a position where it can easily make contact with the element substrate 104. However, as shown in FIG. 24, by providing the output terminal area 169 in a place that is close to the first terminal area 124, wiring run lengths required of the element substrate 104 can be shortened.

Figure 25:
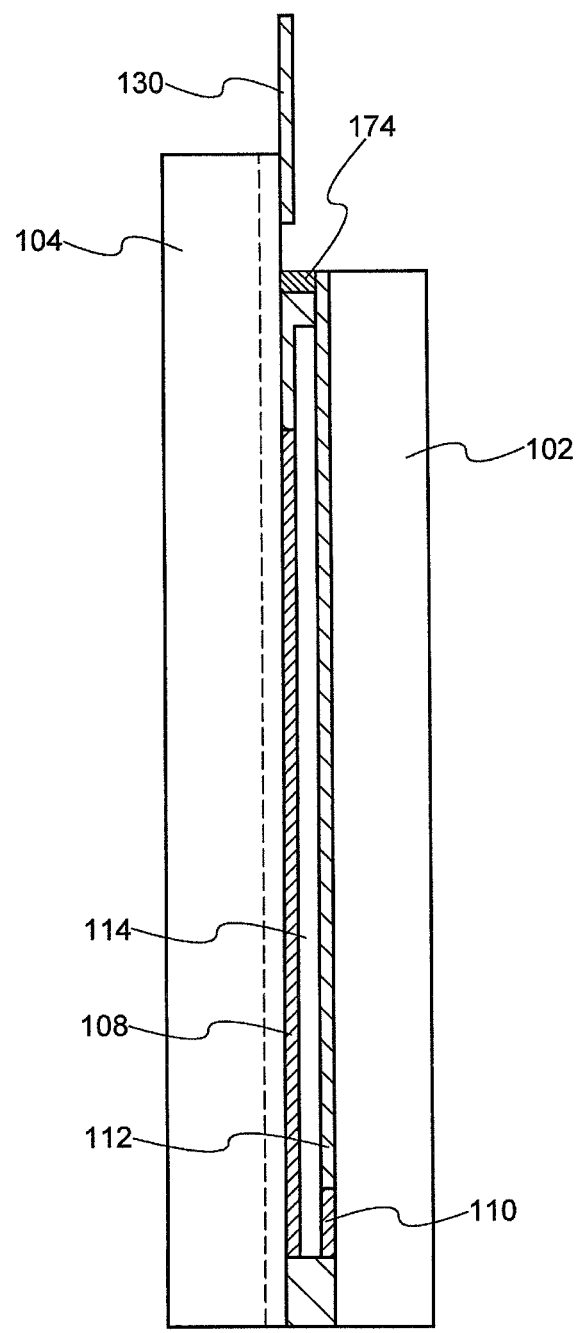
FIG. 25 is a diagram showing a configuration of a display device according to an embodiment of the present invention.

FIG. 25 shows a schematic view of a cross-sectional structure of the display device shown in FIG. 24. The output terminal area 169 is provided in a region outside of the sealing member 118, and is connected via connecting electrodes 174 to predetermined wirings provided over the element substrate 104.

By thus providing the output terminals of the first electrode patterns 108 and those of the second electrode patterns 110 in an inner part of the panel, the number of flexible printed circuits that are required for modulation can be reduced. This makes it possible to achieve a reduction in size of the display panel.

Common Modification of Embodiments 1 to 5

Figure 26:
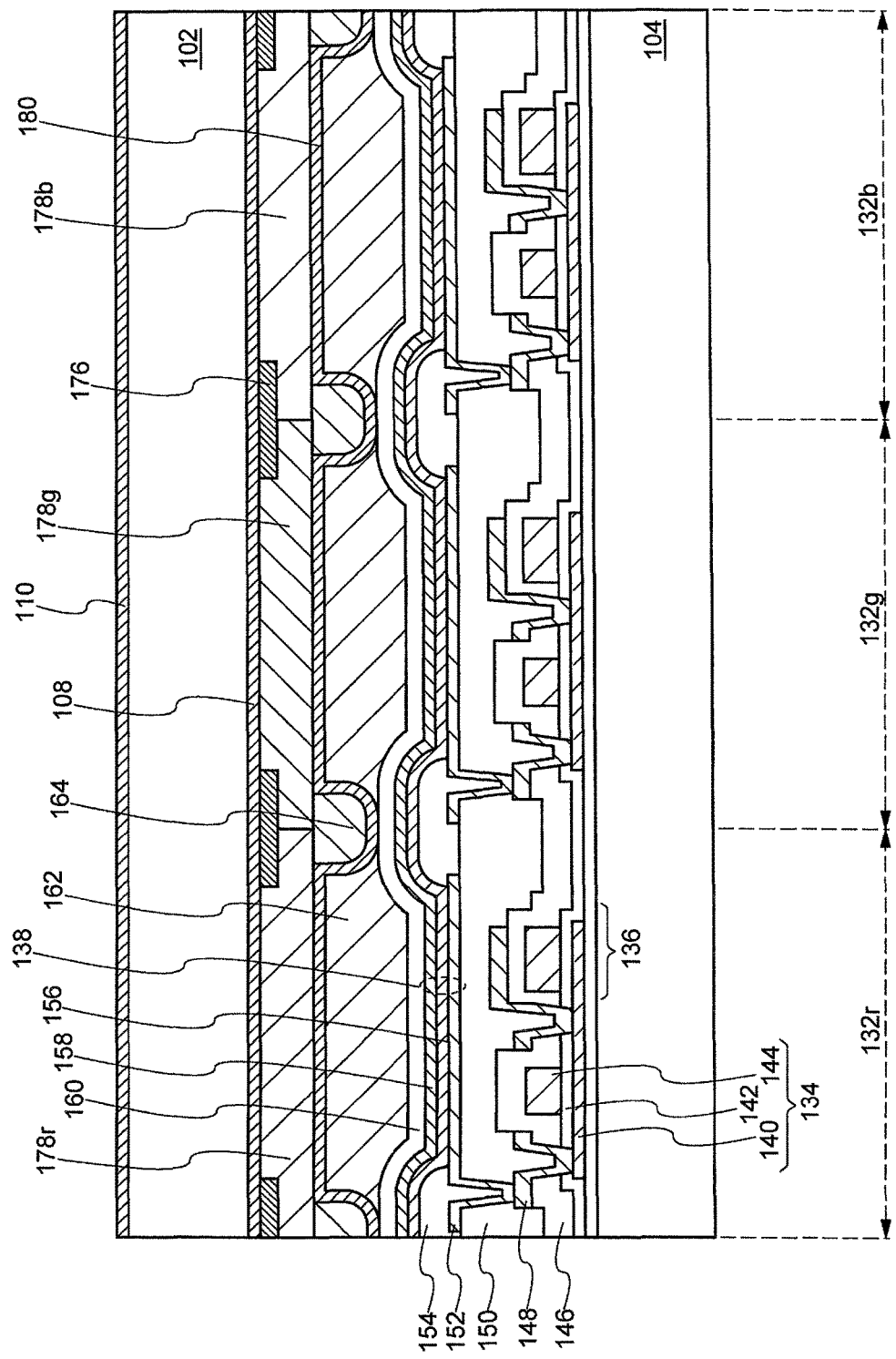
FIG. 26 is a diagram showing an example of a pixel unit in a display device according to an embodiment of the present invention.

In a display device according to an embodiment of the present invention, the translucent opposite substrate 102 can be provided with a color filter. FIG. 26 shows an example of a pixel unit provided with a color filter.

In a case where the first pixel 132r, the second pixel 132g, and the third pixel 132b are a red pixel, a green pixel, and a blue pixel, respectively, a color filter layer 178r that transmits red light, a color filter layer 178g that transmits green light, and a color filter layer 178b that transmits blue light are provided over the translucent opposite substrate 102 in such a manner as to correspond to the respective pixels. A light-blocking layer 176 is provided in a region of boundaries between the color filter layers that transmit different types of light, and prevents mixture of the colors of pixels adjacent to each other. Further, the first electrode patterns 108 are provided over the higher level than the color filter layers and the spacers 164.

In a case where the translucent opposite substrate 102 is provided with a color filter, a light-emitting layer 156 configured to emit white light can be provided. This eliminates the need to fabricate light emitting layers for each separate pixel, and the light-emitting layer 156 can serve as a light-emitting layer that is common to all pixels. In order to emit white light, the light-emitting layer 156 needs only be a laminated structure composed of light emitting layers configured to emit red (R) light, green (G) light, and (B) light, respectively, or of light emitting layers configured to emit blue (B) light and yellow (Y) light, respectively.

Figure 27:
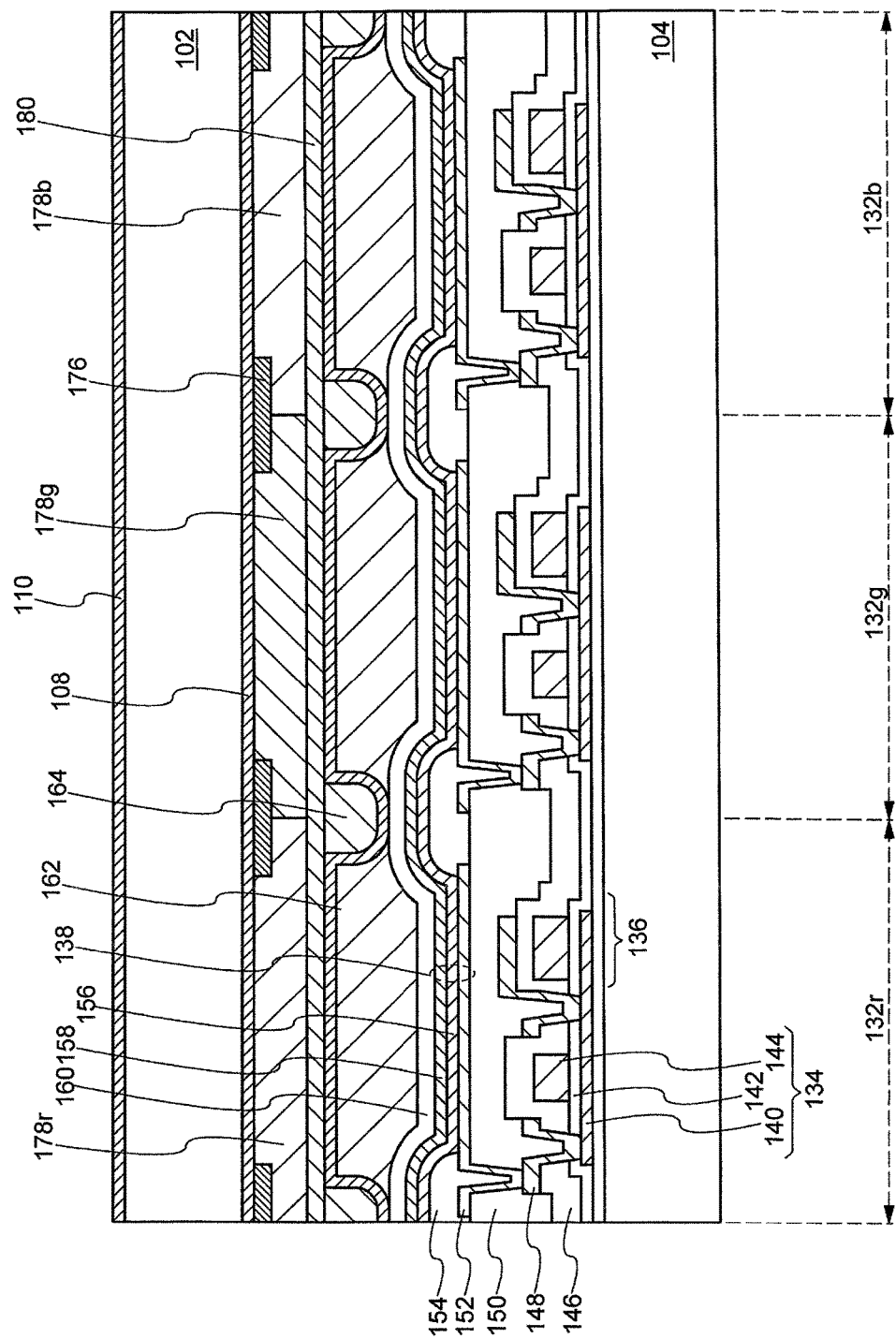
FIG. 27 is a diagram showing an example of a pixel unit in a display device according to an embodiment of the present invention.

It should be noted that as shown in FIG. 27, an overcoat layer 180 may be provided over the higher level than the color filter layers so that the spacers 164 and the first electrodes pattern 108 may be provided over the planarized surface. In a case where spacers are provided over the side of the translucent opposite substrate 102, the spacer can be better made uniform in height by providing the spacers 164 on the surface planarized by the overcoat layer 180. This makes it possible to better keep constant the distance between the element substrate 104 and the translucent opposite substrate 102.

The configuration of pixels in which the translucent opposite substrate 102 is provided with a color filter can be applied to any of the display devices exemplified by Embodiments 1 to 5. This makes it possible to achieve a display device including an input function having a graphical interface that is compatible with a color display.

A display device according to an embodiment of the present invention can be applied to various electronic devices that require graphical user interfaces. For example, a display device according to an embodiment of the present invention can be applied to not only computer devices and portable electronic devices each of which allows an operation to be performed by operating it in such a manner as to touch a displayed image, but also other special-purpose electronic machinery and appliances such as information panels, ticket-vending machines, and cash dispensers.

What is claimed is:

1. A display device comprising:
   a translucent opposite substrate having a sensing unit provided with a first electrode pattern and a second electrode pattern, the first electrode pattern and the second electrode pattern each provided by a transparent conductive film, the first electrode pattern extending, along a first direction, the second electrode pattern extending along a second direction intersecting the first direction;
   an element substrate provided with a pixel unit in accordance with the sensing unit, a pixel unit including a plurality of light-emitting, elements arranged in a matrix;
   a sealing member having a closed-loop pattern surrounding the sensing unit, the sealing member fixing the translucent opposite substrate and the element substrate to each other with the translucent opposite substrate and the element substrate placed opposite each other; and
   a filling material provided above the pixel unit, the filling material is arranged inside and adjacent to the sealing member, wherein
   the translucent opposite substrate has an output wiring overlapping a portion of the sealing member in plan view, a protective insulating layer covering a side surface and an upper surface of the output wiring, and a peripheral member provided as overlapping the sealing member,
   the output wiring, the protective insulating layer and the peripheral member are provided over the same side with the first electrode pattern at the translucent opposite substrate;
   the protective insulating layer is provided with an opening through which an upper end face of the output wiring is exposed, and a side surface and a bottom surface of the protective insulating layer is covered with the sealing member;
   the first electrode pattern is extended from the sensing unit and electrically connected to the output wiring through the opening of the protective insulating layer, the first electrode pattern including an overlap region of part of the overlap with the pixel unit arranged in a matrix in a plan view,
   the output wiring and the protective insulating layer are arranged adjacent to the first electrode pattern in the overlap region,
   the first electrode pattern is in a region overlapping with the sealing member covers a part of a top surface of the protective insulating layer,
   the sealing member is provided to bury the peripheral member,
   wherein the peripheral member comprises:
   a dummy output wiring overlapping a portion of the sealing member in plan view,
   a part of the protective insulating layer covering a side surface and an upper surface of the dummy output wiring,
   the part of the protective insulating layer is provided with a dummy opening through which an upper end face of the dummy output wiring is exposed,
   a dummy first electrode pattern is electrically connected to the dummy output wiring through the dummy opening of the part of the protective insulating layer,
   the sealing member covers a side surface and upper surface of the dummy first electrode pattern,
   the dummy first electrode pattern is not electrically connected to the first electrode pattern, and
   the dummy first electrode pattern is nearer to a corner portion of the translucent opposite substrate than the first electrode pattern in plan view.

2. The display device according to claim 1, wherein the peripheral member is substantially a same in height as the protective insulating layer.

3. The display device according to claim 2, wherein the peripheral member and the protective insulating layer are continuous.

4. The display device according to claim 1, wherein the first electrode pattern and the second electrode pattern have different patterns, and the first electrode pattern has such a wide-area rectangular pattern as to contain a regular pattern of the second electrode pattern.

5. A display device comprising:
   a translucent opposite substrate having a sensing unit provided with a first electrode pattern and a second electrode pattern, the first electrode pattern and the second electrode pattern each provided by a transparent conductive film, the first electrode pattern extending along a first direction, the second electrode pattern extending along a second direction intersecting the first direction;
   an element substrate provided with a pixel unit in accordance with the sensing unit, a pixel unit including a plurality of a light-emitting elements arranged in a matrix;
   a sealing member having a closed-loop pattern surrounding the sensing unit, the sealing member fixing the translucent opposite substrate and the element substrate to each other with the translucent opposite substrate and the element substrate placed opposite each other; and a filling material provided above the pixel unit, the filling material is arranged inside and adjacent to the sealing member;

the translucent opposite substrate having an output wiring overlapping a portion of the sealing member in a plan view, a protective insulating layer covering a side surface and an upper surface of the output wiring, and a peripheral member provided as overlapping the sealing member, the first electrode pattern and the second electrode pattern are provided with an insulating layer sandwiched therebetween and over the same side at the translucent opposite substrate;

the protective insulating layer is provided with an opening through which an upper end face of the output wiring is exposed, and a side surface and a bottom surface of the protective insulating, layer covered with the sealing member;

the first electrode pattern is extended from the sensing unit and electrically connected to the output wiring through the opening of the protective insulating layer, the first electrode pattern includes an overlap region of part of the overlap with the pixel unit arranged in a matrix in a plan view, the output wiring and the protective insulating layer is arranged adjacent to the first electrode pattern in the overlap region, the first electrode pattern in a region overlapping, with the sealing member covers a part of a top surface of the protective insulating layer, the sealing member is provided burying the peripheral member, wherein the peripheral member comprises:

a dummy output wiring overlapping a portion of the sealing member in plan view, a part of the protective insulating layer covering a side surface and an upper surface of the dummy output wiring, the part of the protective insulating layer is provided with a dummy opening through which an upper end face of the dummy output wiring is exposed, a dummy first electrode pattern is electrically connected to the dummy output wiring through the dummy opening of the part of the protective insulating layer, the sealing member covers a side surface and upper surface of the dummy first electrode pattern, the dummy first electrode pattern is not electrically connected to the first electrode pattern, and the dummy first electrode pattern is nearer to a corner portion of the translucent opposite substrate than the first electrode pattern in plan view.

6. The display device according to claim 5, wherein the peripheral member is substantially a same in height as the protective insulating layer.

7. The display device according to claim 6, wherein the peripheral member and the protective insulating layer are continuous.

8. The display device according to claim 5, wherein the first electrode pattern and the second electrode pattern have different patterns, and the first electrode pattern has such a wide-area rectangular pattern as to contain a regular pattern of the second electrode pattern.

9. A method for manufacturing a display device, comprising the steps of:

on an oppose substrate, forming a sensing unit provided by overlapping a first electrode pattern which extends along a first direction and a second electrode pattern which extending along a second direction intersecting the first direction, and that the first electrode pattern and the second electrode pattern separated from each other;

placing, an element substrate opposite a translucent opposite substrate, the element substrate is provided with a pixel unit corresponding to the sensing unit, a pixel unit including a plurality of a light-emitting elements arranged in a matrix;

forming a sealing member on at least either the translucent opposite substrate or the element substrate so that the seal member has a closed-loop pattern surrounding the sensing unit; and forming a filling material above the pixel unit and adjacent to the sealing member in the inside of the sealing member;

wherein before forming the sealing member, forming an output wiring over the translucent opposite substrate, at least part of the output wiring is located in a region overlapping the sealing member in a plan view, forming a protective insulating layer covering a side surface and an upper surface of the output wiring, and the protective insulating layer includes an opening exposing a part of the upper surface of the output wiring, and a side surface and a bottom surface of the protective insulating layer covered with the sealing member, forming the first electrode pattern over an overlap region of part of the overlap with the pixel unit arranged with a translucent opposite substrate in a matrix in a plan view and electrically connected to the output wiring via the opening, the first electrode pattern in the overlap region arranged adjacent to the output wiring and the protective insulating layer, and the first electrode pattern in a region overlapping with the sealing member covering a part of a top surface of the protective insulating layer, forming a peripheral member on a surface of the translucent opposite substrate, the peripheral member being formed so as to be embedded in the sealing member, wherein forming the peripheral member comprises:

forming a dummy output wiring over the translucent opposite substrate to overlap with the sealing member in plan view, forming a part of the protective insulating layer with a dummy opening through which an upper end face of the dummy output wiring is exposed, and forming a dummy first electrode pattern electrically connected to the dummy output wiring through the dummy opening of the part of the protective insulating layer and not electrically connected to the first electrode pattern, and placing the dummy first electrode pattern to nearer to a corner portion of the translucent opposite substrate than the first electrode pattern in plan view, wherein the sealing member forming to cover a side surface and upper surface of the dummy first electrode pattern.

10. The method according to claim 9, wherein the peripheral member is formed to be substantially a same in height as the protective insulating layer.

11. The method according to claim 10, wherein the peripheral member and the protective insulating layer are continuously formed.

12. The method according to claim 9, wherein the second electrode pattern is formed in a regular pattern, and the first electrode pattern is formed in such a wide-area rectangular pattern as to contain the regular pattern of the second electrode pattern.

\* \* \* \* \*